(12) United States Patent
Yoon et al.

(10) Patent No.: US 10,114,501 B2
(45) Date of Patent: Oct. 30, 2018

(54) WEARABLE ELECTRONIC DEVICE USING A TOUCH INPUT AND A HOVERING INPUT AND CONTROLLING METHOD THEREOF

(71) Applicant: Samsung Electronics Co., Ltd., Suwon-si, Gyeonggi-do (KR)

(72) Inventors: Kang-jin Yoon, Seoul (KR); Sung-chan Kim, Suwon-si (KR); Yang-wook Kim, Hwaseong-si (KR); Jun-ho Koh, Suwon-si (KR); Bo-seok Moon, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/222,303

(22) Filed: Jul. 28, 2016

(65) Prior Publication Data

US 2017/0269765 A1 Sep. 21, 2017

(30) Foreign Application Priority Data

Mar. 18, 2016 (KR) .................. 10-2016-0032928

(51) Int. Cl.
*G06F 3/041* (2006.01)
*G06F 3/01* (2006.01)
*G04G 21/08* (2010.01)

(52) U.S. Cl.
CPC ........... *G06F 3/0416* (2013.01); *G04G 21/08* (2013.01); *G06F 3/017* (2013.01); *G06F 2203/04101* (2013.01)

(58) Field of Classification Search
CPC ................ G06F 3/0416; G06F 3/017; G06F 2203/04101; G04G 21/08
See application file for complete search history.

(56) References Cited

U.S. PATENT DOCUMENTS

| | | | |
|---|---|---|---|
| 2011/0115742 A1 | 5/2011 | Sobel et al. | |
| 2012/0084710 A1 | 4/2012 | Sirpal et al. | |
| 2014/0282279 A1* | 9/2014 | Woolley | G06F 3/04883 715/863 |
| 2014/0375598 A1 | 12/2014 | Shen et al. | |
| 2015/0077345 A1* | 3/2015 | Hwang | G06F 3/0412 345/173 |
| 2015/0145818 A1 | 5/2015 | Jeon et al. | |
| 2015/0338964 A1 | 11/2015 | King et al. | |
| 2016/0018944 A1* | 1/2016 | Kim | G06F 1/1626 345/174 |
| 2016/0034041 A1 | 2/2016 | Shin | |
| 2016/0154475 A1 | 6/2016 | Eriksson et al. | |

FOREIGN PATENT DOCUMENTS

KR 10-1363726 B1 2/2014

\* cited by examiner

*Primary Examiner* — Lisa Landis
(74) *Attorney, Agent, or Firm* — Jefferson IP Law, LLP

(57) ABSTRACT

A method of an electronic device including a touch panel for determining a control command is provided. The method includes the operations of receiving at least one touch input, receiving a hovering input, determining the control command corresponding to a combination of the at least one touch input and the received hovering input, and controlling the electronic device according to the determined control command.

13 Claims, 23 Drawing Sheets

| FUNCTION (710) | FRONT SIDE (720) | EDGE (730) | BACK OF HAND (740) | WRIST (750) | ILLUSTRATION (760) |
|---|---|---|---|---|---|
| PLAY/STOP (711) | TOUCH | — | — | — |  |
| NEXT PIECE OF MUSIC (712) | TOUCH | — | HOVERING | — |  |
| FAST FORWARD (713) | — | TOUCH | HOVERING | — |  |
| PREVIOUS PIECE OF MUSIC (714) | TOUCH | — | — | HOVERING |  |
| REWIND (715) | — | TOUCH | — | HOVERING |  |

700

| FUNCTION (1510) | FRONT SIDE (1520) | EDGE (1530) | BACK OF HAND (1540) | WRIST (1550) | ILLUSTRATION (1560) |
|---|---|---|---|---|---|
| VOLUME (1511) | TOUCH | - | HOVERING (VERTICAL FLICK) | - |  |
| BRIGHTNESS (1512) | TOUCH | - | - | HOVERING (VERTICAL FLICK) |  |
| FONT (1513) | - | TOUCH | HOVERING (HORIZONTAL FLICK) | - |  |
| ZOOM (1514) | - | TOUCH | - | HOVERING (HORIZONTAL FLICK) |  |

1500

WEARABLE ELECTRONIC DEVICE USING A TOUCH INPUT AND A HOVERING INPUT AND CONTROLLING METHOD THEREOF

CROSS-REFERENCE TO RELATED PATENT APPLICATION(S)

This application claims the benefit under 35 U.S.C. § 119(a) of Korean patent application filed on Mar. 18, 2016 in the Korean Intellectual Property Office and assigned Serial number 10-2016-0032928, the entire disclosure of which is hereby incorporated by reference.

TECHNICAL FIELD

The present disclosure relates to an electronic device including a touch panel, and a method of controlling the electronic device including the touch panel.

BACKGROUND

As smartphones and tablet personal computers (PCs) become popular, it has become more common to include a touch panel in an electronic device. Technology for sensing a three-dimensional (3D) touch or a proximity touch as an expansion of a touch has become commercialized.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of controlling an electronic device including a touch panel by using a hovering input, and an electronic device including a touch panel that receives a hovering input.

In accordance with an aspect of the present disclosure, a method of an electronic device including a touch panel for determining a control command is provided. The method includes receiving at least one touch input, receiving a hovering input, determining the control command corresponding to a combination of the at least one touch input and the received hovering input, and controlling the electronic device according to the determined control command.

The receiving of the at least one touch input may include receiving the at least one touch input via the touch panel, and the receiving of the hovering input may include receiving the hovering input via at least one of a sensor, a camera, or a touch panel located on one side of the electronic device.

The at least one touch input and the hovering input may be generated from different regions provided in and around the electronic device.

The at least one touch input may be generated from a front portion of the touch panel or an edge portion of the touch panel.

The receiving of the hovering input may include receiving a hovering input of a consecutive gesture type.

The determining of the control command may include determining a control command corresponding to a gesture of the hovering input.

The method may further include determining a first control command corresponding to the at least one touch input, based on the at least one touch input and changing the first control command to a second control command in response to the hovering input.

In accordance with another aspect of the present disclosure, an electronic device for determining a control command is provided. The electronic device includes a touch panel, and a processor configured to receive at least one touch input and a hovering input and to determine a control command corresponding to a combination of the at least one touch input and the received hovering input.

In accordance with an aspect of the present disclosure, a system for determining a control command is provided. The system includes an electronic device having a touch panel, an object coupled to the electronic device so as to form a peripheral region around the electronic device, and a processor configured to receive a touch input from the touch panel, to receive a hovering input corresponding to an operation of a user in the peripheral region, and to determine a control command corresponding to a combination of the touch input and the hovering input.

The electronic device further comprises at least one of a sensor and a camera, and the processor is further configured to receive the hovering input via at least one of the sensor and the camera located on the electronic device.

The processor is further configured to receive the hovering input when the hovering input is received within a predetermined period.

The peripheral region comprises a plurality of peripheral regions.

the plurality of peripheral regions around the electronic device include a left peripheral region, a right peripheral region, an upper peripheral region, a lower peripheral region, and a front peripheral region, and the front peripheral region includes a space in front of the electronic device.

In accordance with another aspect of the present disclosure, a non-transitory computer-readable recording medium has recorded thereon a computer program, which, when executed by a computer, is provided and performs the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
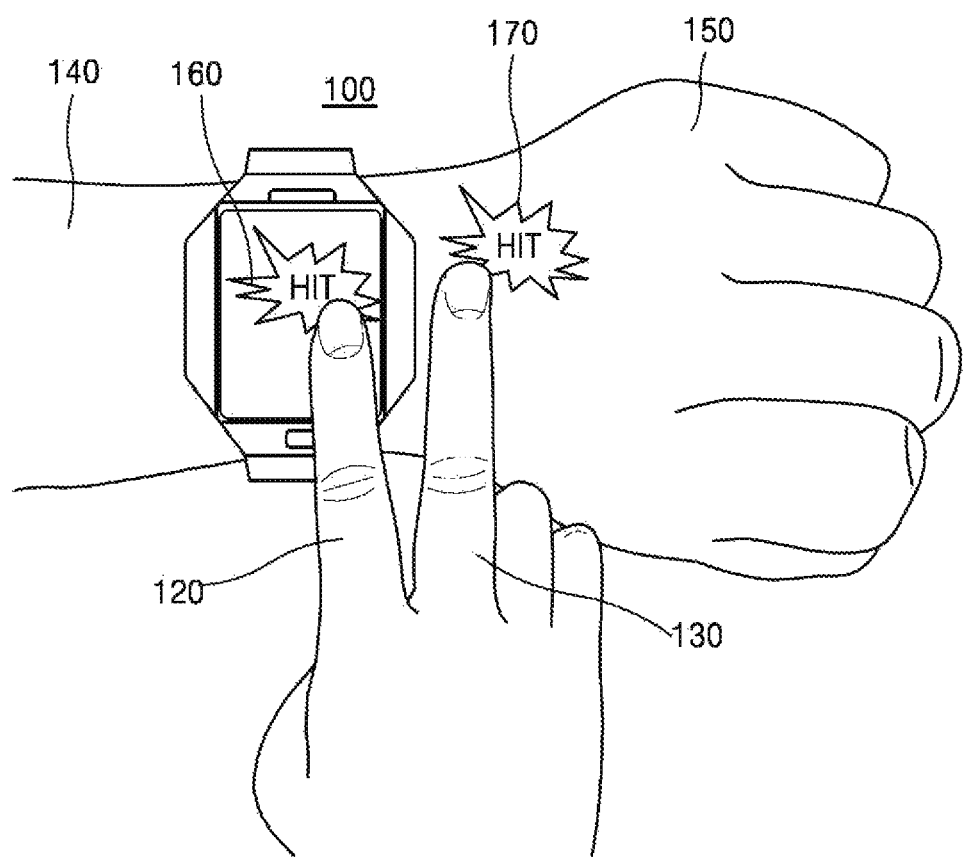
FIG. 1 is a schematic view for explaining a method of controlling an electronic device including a touch panel according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although general terms widely used at present were selected for describing the present disclosure in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

While such terms as "first," "second," etc., may be used to describe various components, such components must not be limited to the above terms. The above terms are used only to distinguish one component from another.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Also, the operations of all methods described herein can be performed in any suitable order unless otherwise indicated herein or otherwise clearly contradicted by context. Various embodiments of the present disclosure are not limited to the described order of the operations.

Thus, the expression "according to an embodiment" used in the entire specification does not necessarily indicate the same embodiment of the present disclosure.

Various embodiments of the present disclosure may be described in terms of functional block components and various processing operations. Some or all of such functional blocks may be realized by any number of hardware and/or software components configured to perform the specified functions. For example, functional blocks according to the present disclosure may be realized by one or more microprocessors or by circuit components for a predetermined function.

Furthermore, the connecting lines or connectors between components shown in the various figures presented are intended to represent functional relationships and/or physical or logical couplings between the components. Connections between components may be represented by many alternative or additional functional relationships, physical connections or logical connections in a practical device.

The present disclosure will now be described more fully with reference to the accompanying drawings, in which various embodiments of the present disclosure are shown.

FIG. 1 is a schematic view for explaining a method of controlling an electronic device including a touch panel according to an embodiment of the present disclosure.

Referring to FIG. 1, an electronic device 100 may be a wearable device that is worn by a user. However, the type of the electronic device 100 is not limited to a wearable device. According to another embodiment of the present disclosure, the electronic device 100 may include, but is not limited to, a smartphone, a tablet personal computer (PC), and a smart television (TV).

Referring to FIG. 1, a user may touch the electronic device 100 with a first finger 120. According to an embodiment of the present disclosure, the user may touch the touch panel included in the electronic device 100. The electronic device 100 may determine and execute a control command corresponding to a touch location 160 touched by the first finger 120.

According to an embodiment of the present disclosure, the electronic device 100 may receive a hovering input. In the present specification, the hovering input may denote an input corresponding to an operation of a user at a close distance but not directly touching the electronic device 100.

The electronic device 100 may receive a hovering input by using the touch panel or at least one sensor or camera, and a method that is used to receive the hovering input is not limited thereto. A method of receiving a hovering input by using the touch panel will be described in detail later with reference to FIG. 4.

According to an embodiment of the present disclosure, the user may perform a hovering input with respect to a back of a hand 150. In the present specification, the hovering input with respect to the back of the hand 150 may denote a hovering input that is generated on a side of the electronic device 100 that faces toward the back of the hand 150. For example, when the user moves a finger over the back of the hand 150, the electronic device 100 may receive a hovering input by sensing a motion of the finger.

The user may touch the back of the hand 150 by using a second finger 130 or may move the second finger 130 over the back of the hand 150 while touching the back of the hand 150, but various embodiments are not limited thereto. According to an embodiment of the present disclosure, the user may move the second finger 130 without touching the back of the hand 150.

The electronic device 100 may receive as a hovering input an operation, performed by the user, of touching the back of the hand 150. According to another embodiment of the present disclosure, the electronic device 100 may receive as a hovering input an operation, performed by the user, of touching a wrist 140. Peripheral regions around the electronic device 100, where hovering inputs are received, will be described later in detail with reference to FIG. 3.

According to an embodiment of the present disclosure, the electronic device 100 may determine and execute a control command corresponding to a hovering input. For example, the electronic device 100 may determine and execute a control command according to existence or absence of a hovering input.

As another example, the electronic device 100 may determine and execute a control command corresponding to a touch location 170 on the back of the hand 150 touched by the second finger 130. A method of determining a control command corresponding to a hovering input will be described later in detail.

Figure 2:
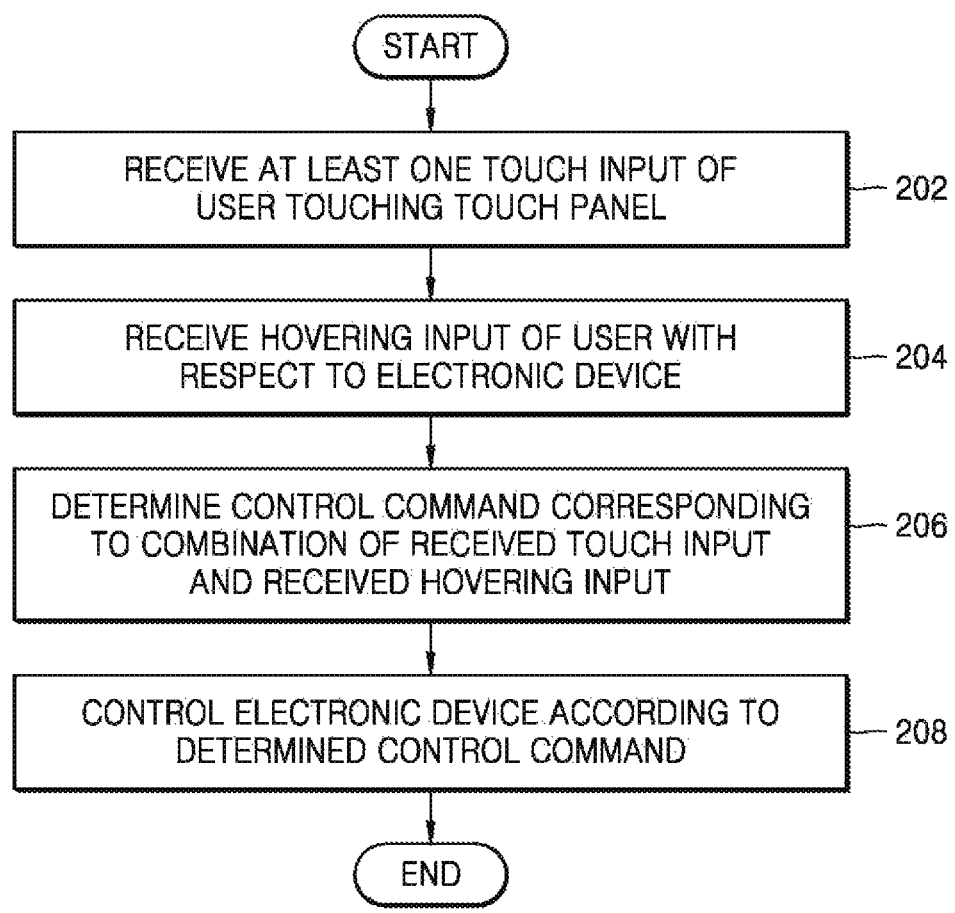
FIG. 2 is a flowchart of a method of controlling an electronic device including a touch panel according to an embodiment of the present disclosure.

FIG. 2 is a flowchart of a method of controlling an electronic device including a touch panel according to an embodiment of the present disclosure.

Referring to FIG. 2, in operation 202, the electronic device 100 receives at least one touch input of a user touching the touch panel. According to an embodiment of the present disclosure, the touch panel included in the electronic device 100 may include a front portion and an edge portion. The electronic device 100 may receive at least one of a touch input with respect to the front portion of the touch panel and a touch input with respect to the edge portion of the touch panel.

According to an embodiment of the present disclosure, the electronic device 100 may determine a first control command, based on at least one touch input of the user touching the touch panel. For example, the electronic device 100 may determine a first control command corresponding to a user interface (UI) displayed at a location where a touch input was received.

The first control command may include a command for controlling an application displayed on the electronic device 100. For example, when a music playback application is displayed on the electronic device 100, the first control command may be a control command that enables music to be played back.

In operation 204, the electronic device 100 receives a hovering input of the user with respect to the electronic device 100. The electronic device 100 may receive a hovering input with respect to a region other than a region from which a touch input was received.

According to an embodiment of the present disclosure, the electronic device 100 may receive a hovering input of the user with respect to a peripheral region around the electronic device 100, within a preset time period after a touch input is received. According to another embodiment of the present disclosure, the electronic device 100 may receive a hovering input of the user with respect to the electronic device 100, within a preset time period before or after a touch input is received. According to an embodiment of the present disclosure, the electronic device 100 may receive a hovering input with respect to a peripheral region opposite to a lateral side of the electronic device 100, by using the touch panel. According to another embodiment of the present disclosure, the electronic device 100 may receive a hovering input with respect to a region other than a region touched via a touch input from among the entire region of the touch panel.

According to an embodiment of the present disclosure, the electronic device 100 may ignore a hovering input that is received after the preset time period after the touch input is received. According to another embodiment of the present disclosure, the electronic device 100 may not receive a hovering input unless the electronic device 100 receives a touch input.

In many cases, an unwanted hovering input or a wrong hovering input may be generated. The electronic device 100 may receive a hovering input that is consistent with the intention of the user, by selectively receiving a hovering input.

In operation 206, the electronic device 100 determines a control command corresponding to a combination of the received touch input and the received hovering input. According to an embodiment of the present disclosure, the electronic device 100 may determine a control command by using the locations from which the touch input and the hovering input were received. For example, while the electronic device 100 is playing back music, a touch input may be received from a front portion of the electronic device 100 and a hovering input may be received from a right lateral side of the electronic device 100. In this case, the electronic device 100 may play back a piece of music next to the currently-being-played back music. According to another embodiment of the present disclosure, the electronic device 100 may determine a control command corresponding to a gesture shape of the hovering input.

According to an embodiment of the present disclosure, in response to the hovering input of the user, the electronic device 100 may change the first control command determined based on the touch input to a second control command corresponding to a combination of the touch input and the hovering input. The second control command corresponding to a combination of the touch input and the hovering input may be determined depending on the location of the touch input, the type of the touch input, the location of the hovering input, and the type of the hovering input. According to an embodiment of the present disclosure, the electronic device 100 may determine the second control command, based on the first control command and the received hovering input. For example, the electronic device 100 may determine the second control command, based on the type of the first control command, the location of the hovering input, and the type of the hovering input. The electronic device 100 may change the first control command to the determined second control command.

In operation 208, the electronic device 100 may be controlled according to the determined control command. According to an embodiment of the present disclosure, the electronic device 100 may be controlled according to the second control command. When no hovering inputs are received within a preset time period after the first control command is determined, the electronic device 100 may be controlled according to the first control command.

Figure 3:
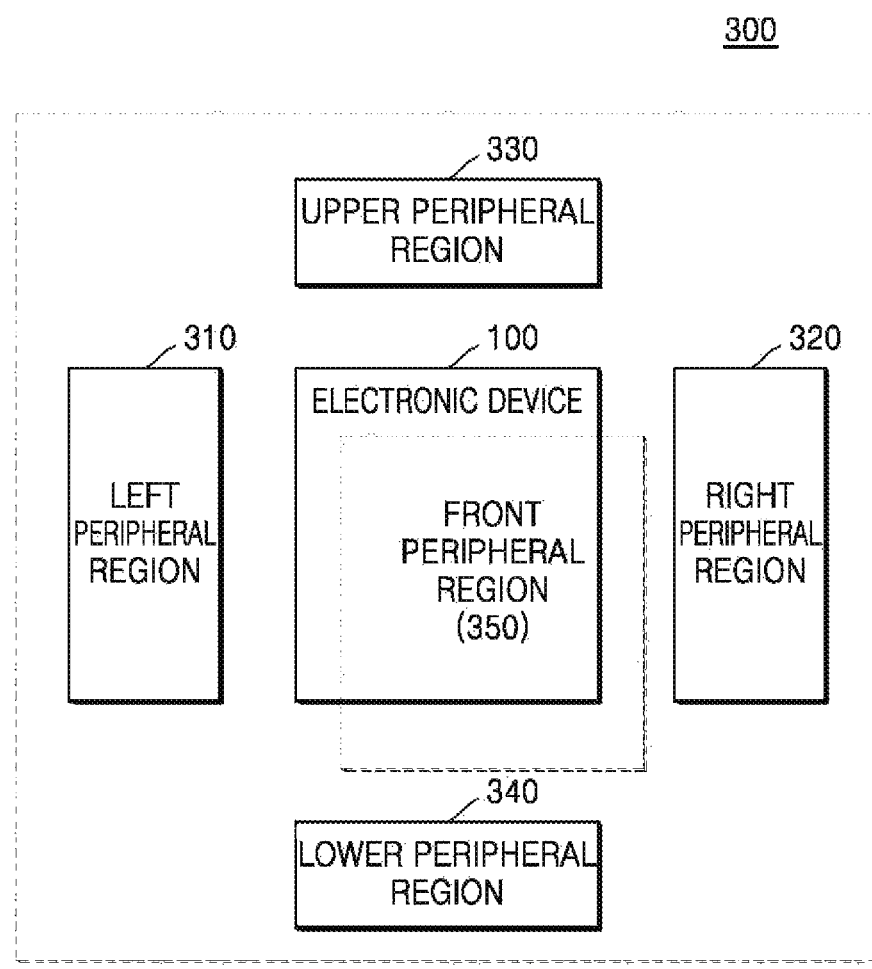
FIG. 3 is a block diagram of a peripheral region around the electronic device according to an embodiment of the present disclosure.

FIG. 3 is a block diagram of a peripheral region around the electronic device according to an embodiment of the present disclosure.

Referring to FIG. 3, the electronic device 100 may receive a hovering input of a user with respect to the peripheral region 300. The shape of the peripheral region 300 shown in FIG. 3 is only an example, and the shape of the peripheral region 300 is not limited to the shape shown in FIG. 3. According to an embodiment of the present disclosure, the peripheral region 300 may denote a range within which the electronic device 100 may receive a hovering input.

According to another embodiment of the present disclosure, the peripheral region 300 may denote a region previously set by the user. In this case, a hovering input determined to be received from a region other than the preset region may be ignored from among hovering inputs received by the electronic device 100.

The peripheral region 300 may be divided into at least one peripheral region according to the shape of the electronic device 100 or the location of the touch panel, the sensor, or the camera included in the electronic device 100. According to an embodiment of the present disclosure, the peripheral region 300 may include lateral peripheral regions 310-340 and a front peripheral region 350 around the electronic device 100.

For example, the electronic device 100 may be quadrilateral. In this case, the electronic device 100 may include a touch panel, a sensor, or a camera located on each of the four edge portions of the electronic device 100. The lateral peripheral regions 310-340 may be peripheral regions respectively corresponding to the four edge portions.

Referring to FIG. 3, the lateral peripheral regions 310-340 may include a left peripheral region 310, a right peripheral region 320, an upper peripheral region 330, and a lower peripheral region 340. The peripheral region 300 may further include the front peripheral region 350. The front peripheral region 350 may denote a space in front of the electronic device 100.

The peripheral regions shown in FIG. 3 are only an example, and the locations, sizes, and shapes of the peripheral regions are not limited thereto.

According to an embodiment of the present disclosure, the electronic device 100 may determine that hovering inputs respectively received from the peripheral regions are different from one another. For example, the electronic device 100 may make the hovering inputs received from the different peripheral regions correspond to different control commands.

According to an embodiment of the present disclosure, the electronic device 100 may simultaneously receive a plurality of hovering inputs. In this case, the electronic device 100 may simultaneously receive a plurality of hovering inputs from different peripheral regions.

The electronic device 100 may determine and execute a control command corresponding to each of the plurality of the hovering inputs. The electronic device 100 may determine and execute a control command corresponding to a combination of the plurality of the hovering inputs.

Figure 4:
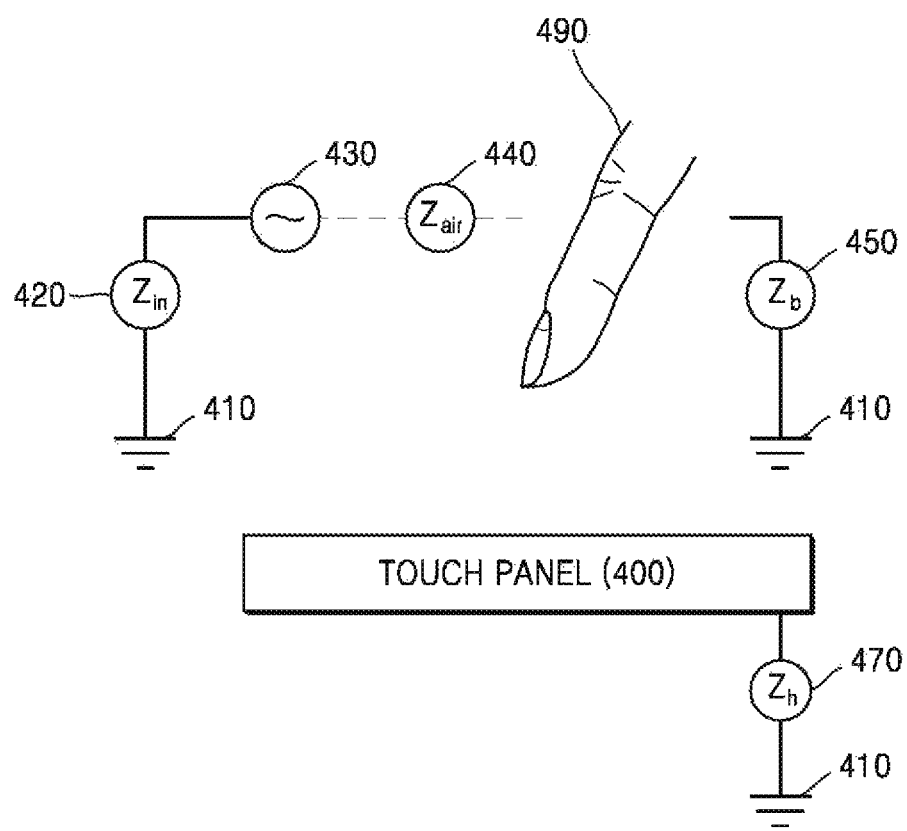
FIG. 4 illustrates a structure for receiving a hovering input by using a touch panel according to an embodiment of the present disclosure.

FIG. 4 illustrates a structure for receiving a hovering input by using a touch panel according to an embodiment of the present disclosure.

Referring to FIG. 4, according to an embodiment, a touch panel 400 included in the electronic device 100 may include a touch sensor and an electrode included in the touch sensor.

A user may be surrounded by electric fields emitted by devices within an environment. In general, this electric field may be considered a portion of electromagnetic interference (EMI) with an environment. This electric field may be carried to all over the body of the user, and may be electrostatic-capacitively connected to the electrode of the touch panel 400 included in the electronic device 100.

Instead of refusing such noise, a noise touch may be used to detect a touch of the user. In the present specification, the noise touch denotes a touch sensing method that uses noise that is transmitted to the body and picked up by the electrode of the touch sensor included in the touch panel 400.

The touch panel 400 may sense a touch input of the user by using a noise touch. The touch panel 400 may also sense a hovering input by using a noise touch.

Since the noise touch uses noise of an environment, the noise touch is immune to EMI, and there is no need to discharge an electric field in order to sense an interaction of the user. The usage range of the noise touch may be easily expanded. For example, a noise touch may also be applied to a surface having any shape or size, and may obtain an immediate reaction.

EMI power 430 within an environment may be grounded to a ground 410 via an impedance $Z_{in}$ 420, and may be connected to the body of the user by using impedance $Z_{air}$ 440. An external source 490 is connected to the ground 410 via impedance $Z_b$ 450.

Referring to FIG. 4, the external source 490 may denote any external object that is used to touch the touch panel 400. For example, the external source 490 may denote a body including a finger of the user.

The EMI power 430 is connected to the electrode included in the touch panel 400 via a selective insulator, and is received by the electronic device 100 connected to the ground 410 via impedance $Z_h$ 470. For example, a slight potential difference may be generated with respect to all external sources in surroundings sensed by the electronic device 100, according to a difference between impedance values used to ground different components within a system and a variation in exposure to an electric field induced by EMI.

For example, when a large antenna, such as a human body, is close to the touch panel 400, characteristics of noise may be different from when a human body is not close to the touch panel 400. The electronic device 100 may receive a touch input and a hovering input, based on a variation in the characteristics of noise sensed by the touch panel 400.

The structure for and the method of receiving a touch input and a hovering input shown in FIG. 4 are only an example, and a structure and a method used to receive the touch input and the hovering input is not limited.

Figure 5:
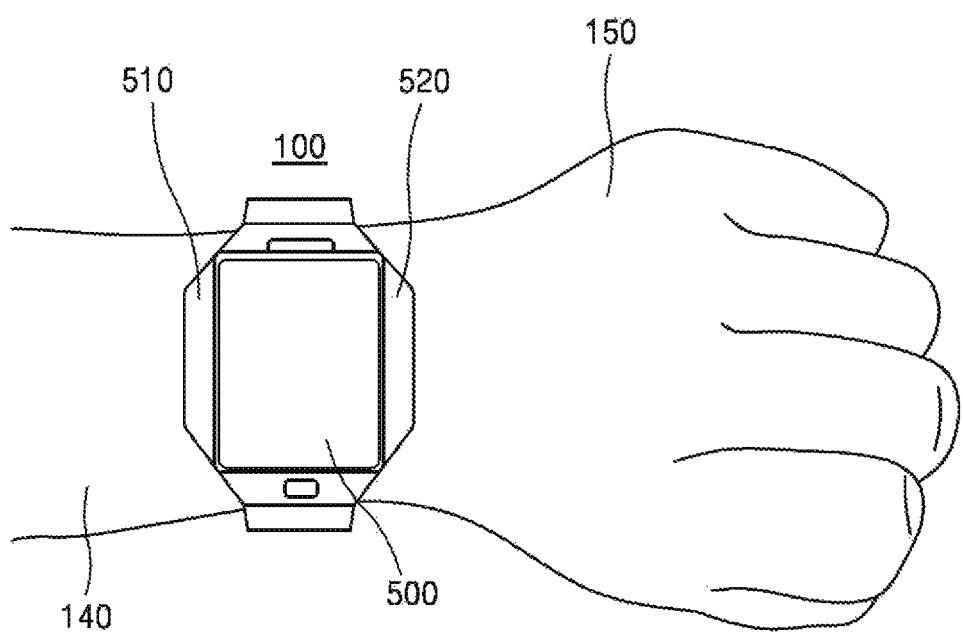
FIG. 5 illustrates an example of an electronic device including left and right edges according to an embodiment of the present disclosure.

FIG. 5 illustrates an example of an electronic device including left and right edges according to an embodiment of the present disclosure.

Referring to FIG. 5, the electronic device 100 may include a left edge 510 and a right edge 520. According to an embodiment of the present disclosure, the touch panel 400 included in the electronic device 100 may be defined by a front portion 500, the left edge 510, and the right edge 520.

According to an embodiment of the present disclosure, the electronic device 100 may receive a hovering input of a user with respect to the wrist 140 by using a sensor located on the left edge 510 around the touch panel 400. The wrist 140 of FIG. 5 may correspond to the left peripheral region 310 of FIG. 3.

The electronic device 100 may also receive a hovering input of the user with respect to the back of the hand 150 by using a sensor located on the right edge 520 of the touch panel 400. The back of the hand 150 of FIG. 5 may correspond to the right peripheral region 320 of FIG. 3.

The sensors located on the left edge 510 and the right edge 520 may include, but are not limited to, touch sensors, infrared sensors, and ultrasound sensors included in a touch panel.

The electronic device 100 may further include cameras located on the left edge 510 and the right edge 520. The electronic device 100 may receive hovering inputs of the user by using the cameras.

Figure 6:
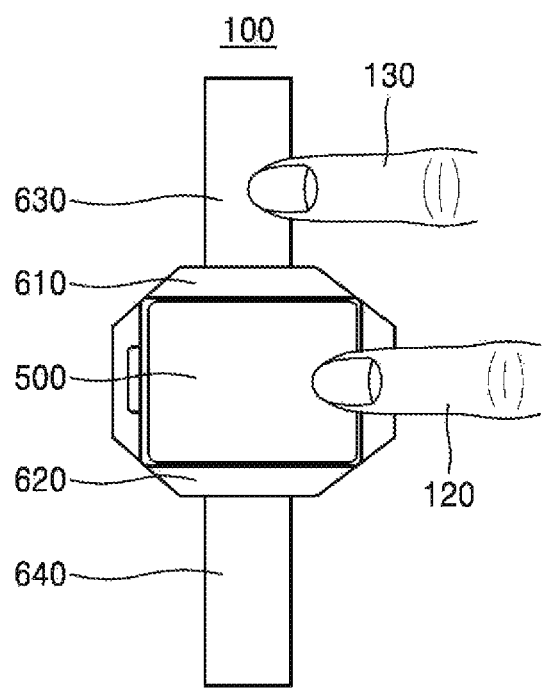
FIG. 6 illustrates an example of an electronic device including upper and lower edges according to an embodiment of the present disclosure.

FIG. 6 illustrates an example of an electronic device including upper and lower edges according to an embodiment of the present disclosure.

Referring to FIG. 6, the electronic device 100 may include an upper edge 610 and a lower edge 620. According to an embodiment of the present disclosure, the touch panel 400 included in the electronic device 100 may be defined by the front portion 500, the upper edge 610, and the lower edge 620.

According to an embodiment of the present disclosure, the electronic device 100 may receive a hovering input of the user with respect to a watch strap 630 by using a sensor located on the upper edge 610 of the touch panel 400. The watch strap 630 of FIG. 6 may correspond to the upper peripheral region 330 of FIG. 3.

The electronic device 100 may also receive a hovering input of the user with respect to a watch strap 640 by using a sensor located on the lower edge 620 of the touch panel 400. The watch strap 640 of FIG. 6 may correspond to the lower peripheral region 340 of FIG. 3.

The electronic device 100 may receive a touch input of the first finger 120 touching the front portion 500 of the touch panel. The electronic device 100 may also receive a hovering input of the second finger 130 touching the watch strap 630 or 640.

Figure 7:
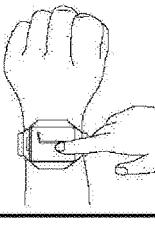
FIG. 7 is a table showing an example of a method of determining a control command corresponding to a combination of a touch input and a hovering input according to an embodiment of the present disclosure.
Figure 7:
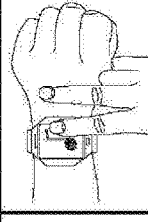
Figure 7:
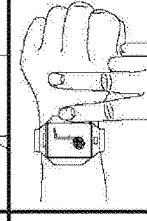
Figure 7:
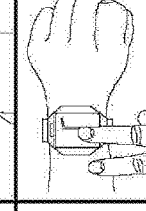
Figure 7:
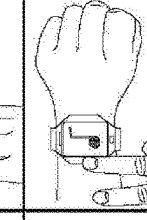

FIG. 7 is a table showing an example of a method of determining a control command corresponding to a combination of a touch input and a hovering input according to an embodiment of the present disclosure.

Referring to FIG. 7, the electronic device 100 may play back music. For example, the electronic device 100 may be executing a music playback application. A user may control the music playback application by using a touch input and a hovering input.

The electronic device 100 may receive a touch input of the user. Referring to FIG. 7, the electronic device 100 may receive at least one of a touch input with respect to a front side 720 and a touch input with respect to an edge 730.

The electronic device 100 may receive a hovering input of the user. Referring to FIG. 7, the electronic device 100 may receive at least one of a hovering input with respect to the back of a hand 740 and a hovering input with respect to a wrist 750.

The electronic device 100 may determine a control command corresponding to a combination of the touch input and the hovering input. Referring to a table 700 of FIG. 7, control commands that may be determined by the electronic device 100 may include functions 710 such as a play/stop 711, a next piece of music 712, a fast forward 713, a previous piece of music 714, and a rewind 715.

Referring to FIG. 7, in response to a touch input of the user touching the front side 720, the electronic device 100 may play back or stop music. For example, the electronic device 100 may play back music when the user touches the front side 720. When the user touches the front side 720 while music is being played back, the electronic device 100 may stop playing back the music.

The electronic device 100 may receive the touch input of the user touching the front side 720 and may receive a hovering input of the user with respect to the back of a hand 740 within a preset time period starting from the touch input. In this case, the electronic device 100 may play back a next piece of music.

According to an embodiment of the present disclosure, in response to a touch input of the user, the electronic device 100 may determine a first control command. For example, when the electronic device 100 receives a touch input of the user touching a front side, the electronic device 100 may determine the first control command, based on a location from which the touch input is received, an application currently being executed in the electronic device 100, and a UI displayed on the screen.

According to an embodiment of the present disclosure, the electronic device 100 may acquire a touch coordinate from where the touch input of the user has been received. The electronic device 100 may determine a UI corresponding to the touch coordinate. The electronic device 100 may determine as the first control command a control command corresponding to the determined UI.

For example, the electronic device 100 may be displaying a music playback application. In this case, the electronic device 100 may receive a touch input of the user. The electronic device 100 may acquire a touch coordinate from which the touch input of the user has been received. When the acquired touch coordinate corresponds to a play/stop UI, the electronic device 100 may determine as the first control command a control command for playing back or stopping music.

According to an embodiment of the present disclosure, the touch coordinate acquired by the electronic device 100 may correspond to an edge portion of the electronic device 100. In this case, the electronic device 100 may determine the first control command, based on a UI corresponding to the edge portion. For example, the electronic device 100 may determine as the first control command a control command for displaying a music playback list.

In response to a hovering input of the user, the electronic device 100 may change the first control command determined based on the touch input to a second control command corresponding to a combination of the received touch input and the received hovering input. For example, in response to a touch input with respect to the front side of the electronic device 100 and a hovering input of the user with respect to the back of a hand, the electronic device 100 may determine as the second control command a control command for playing back a next piece of music. The electronic device 100 may change the first control command for playing back or stopping music to the second control command for playing back a next piece of music.

According to an embodiment of the present disclosure, the electronic device 100 may change the first control command to the second control command, based on the first control command and the hovering input of the user. For example, the first control command may be a control command for playing back music. The electronic device 100 may receive a hovering input of the user with respect to the back of a hand. In this case, the electronic device 100 may determine as the second control command a control command for playing back a next piece of music. The electronic device 100 may change the first control command for playing back music to the second control command for playing back a next piece of music.

The electronic device 100 may be controlled based on the second control command. When no hovering inputs are received within a preset time period after the touch input is received, the electronic device 100 may be controlled according to the first control command.

According to an embodiment of the present disclosure, the electronic device 100 may determine the second control command, based on the type of hovering input. According to an embodiment of the present disclosure, the electronic device 100 may determine the second control command, based on the gesture type of the hovering input. For example, the first control command may be a control command for playing back music, and the electronic device 100 may receive a hovering input of touching the back of a hand. In this case, the electronic device 100 may determine as the second control command a control command for playing back a next piece of music. The electronic device 100 may change the first control command for playing back music to the second control command for playing back a next piece of music. The electronic device 100 may receive a hovering input of vertically moving a finger. In this case, the electronic device 100 may determine as the second control command a control command for adjusting a playback speed. The electronic device 100 may change the first control command for playing back music to the second control command for adjusting the playback speed.

According to an embodiment of the present disclosure, the electronic device 100, as illustrated in column 760 of the table 700, may be a wearable device that is worn by the user, and the hovering input may be an input of touching a body part of the user around the electronic device 100. For example, the hovering input with respect to the back of a hand may be based on an operation of touching the back of a hand. The electronic device 100 may determine whether the body of the user was physically or actually touched, based on the hovering input. For example, when a hovering input is sensed from a region adjacent to the body of the user around the electronic device 100 and an acceleration variation of the electronic device 100 sensed by an acceleration sensor 42 of FIG. 23 within a certain time period is within a certain range, the electronic device 100 may determine that the body of the user was physically or actually touched, based on the hovering input. However, a method of determining whether the body of the user was physically or actually touched is not limited thereto. The electronic device 100 may determine a control command according as the body of the user is touched. In this case, even when a hovering input is received, the electronic device 100 may ignore the hovering input when the body of the user is not touched. However, a body touch due to a hovering input described above according to an embodiment is not limited to a physical or actual touch, and may be a proximity touch close to the body.

The electronic device 100 may receive a touch input of the user touching the edge 730 and may receive a hovering input of the user with respect to the back of a hand 740 within a preset time period starting after the touch input. In this case, the electronic device 100 may perform fast forward.

The electronic device 100 may receive a touch input of the user touching the front side 720 and may receive a hovering input of the user with respect to the wrist 750 within a preset time period starting from the touch input. In this case, the electronic device 100 may play back a previous piece of music.

The electronic device 100 may receive a touch input of the user touching the edge 730 and may receive a hovering input of the user with respect to the wrist 750 within a preset time period starting from the touch input. In this case, the electronic device 100 may perform rewind.

Figure 8:
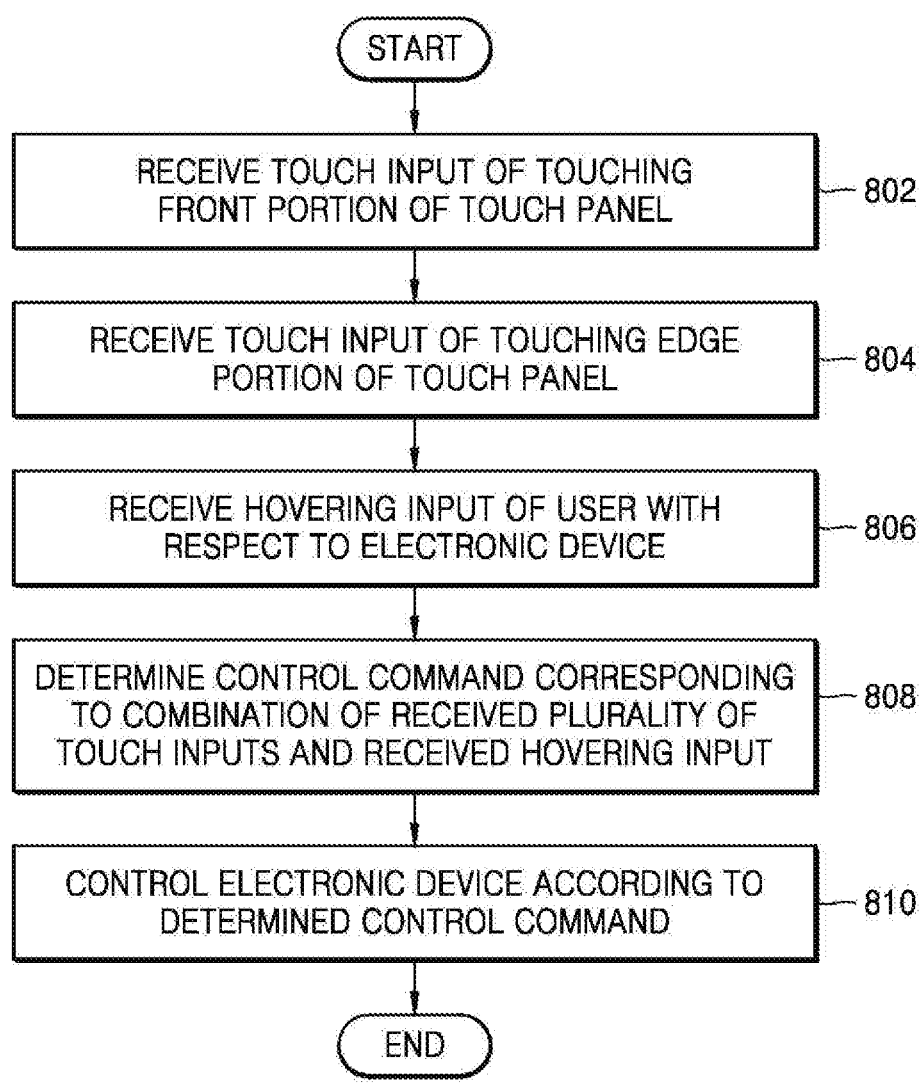
FIG. 8 is a flowchart of a method of controlling an electronic device that receives a plurality of touch inputs according to an embodiment of the present disclosure.

FIG. 8 is a flowchart of a method of controlling an electronic device that receives a plurality of touch inputs according to an embodiment of the present disclosure. The method of FIG. 8 is an embodiment of the method of FIG. 2. Accordingly, although omitted, descriptions of the embodiment of FIG. 2 also apply to the embodiment of FIG. 8.

Referring to FIG. 8, according to an embodiment of the present disclosure, the electronic device 100 may receive a plurality of touch inputs of touching a touch panel. The electronic device 100 may determine a control command corresponding to a combination of the received plurality of touch inputs and a received hovering input.

In operation 802, the electronic device 100 may receive a touch input of touching a front portion of the touch panel.

In operation 804, the electronic device 100 may receive a touch input of touching an edge portion of the touch panel. The edge portion of the touch panel may include at least one of an upper edge, a lower edge, a left edge, and a right edge.

In operation 806, the electronic device 100 may receive a hovering input of the user with respect to the electronic device 100. According to an embodiment of the present disclosure, the electronic device 100 may receive a hovering input of the user with respect to the electronic device 100, within a preset time period. The electronic device 100 may not receive a hovering input of the user with respect to the electronic device 100, after the preset time period.

In operation 808, the electronic device 100 may determine a control command corresponding to a combination of the received plurality of touch inputs and the received hovering input. According to an embodiment of the present disclosure, the electronic device 100 may determine a control command corresponding to a combination of the received hovering input and at least one of the received plurality of touch inputs.

In operation 810, the electronic device 100 may be controlled according to the determined control command.

Figure 9:
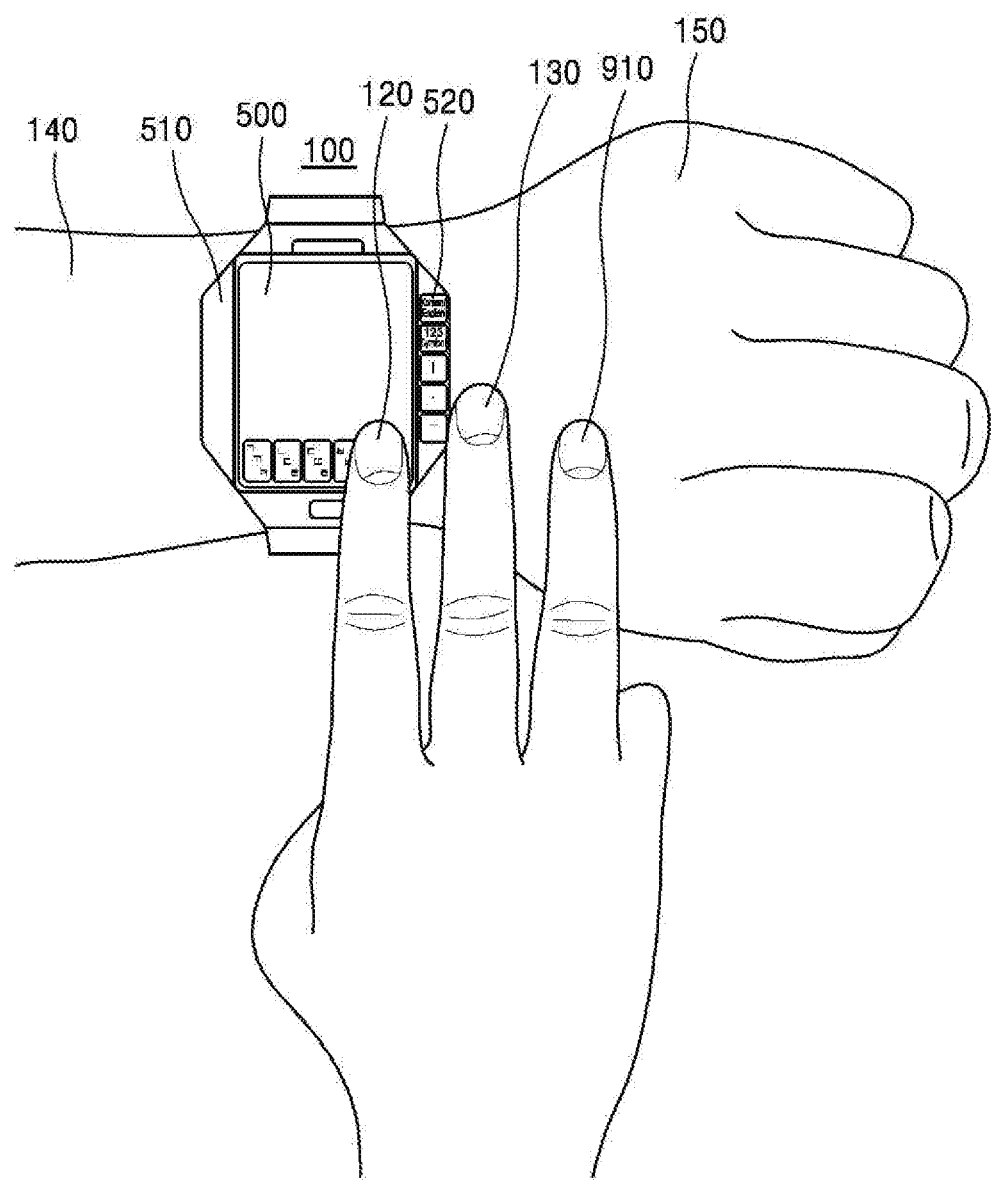
FIG. 9 illustrates a method of controlling an electronic device that receives a plurality of touch inputs according to an embodiment of the present disclosure.

FIG. 9 illustrates a method of controlling an electronic device that receives a plurality of touch inputs according to an embodiment of the present disclosure.

Referring to FIG. 9, the electronic device 100 may include the front portion 500 and the edge portions 510 and 520. According to an embodiment of the present disclosure, the user may perform a touch input by using the first finger 120 and the second finger 130. The user may also perform a hovering input by using a third finger 910.

For example, the user may perform a touch input of touching the front portion 500 of the electronic device 100 by using the first finger 120. The user may also perform a touch input of touching the edge portions 510 and 520 of the electronic device 100 by using the second finger 130.

The user may also perform a hovering input with respect to a peripheral region around the electronic device 100 by using the third finger 910. For example, the user may perform a hovering input with respect to the back of the hand 150 or the wrist 140 by using the third finger 910.

The electronic device 100 may determine and execute a control command corresponding to a combination of the touch input with respect to the front portion 500, the touch inputs with respect to the edge portions 510 and 520, and the hovering input with respect to the peripheral region around the electronic device 100.

Figure 10:
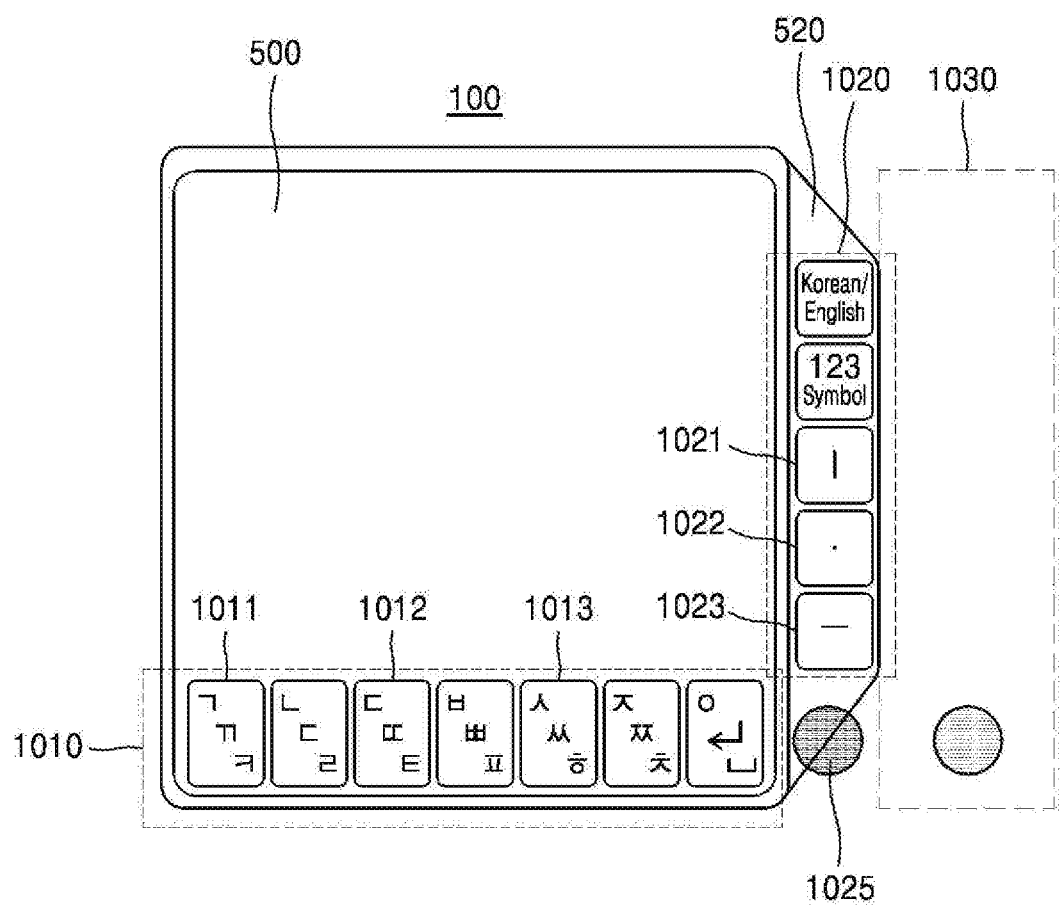
FIG. 10 illustrates a method of inputting Korean alphabet letters by using an electronic device that performs a plurality of touch inputs according to an embodiment of the present disclosure.

FIG. 10 illustrates a method of inputting Korean alphabets by using an electronic device that performs a plurality of touch inputs according to an embodiment of the present disclosure.

Referring to FIG. 10, the electronic device 100 may include the front portion 500 and the edge portion 520. The electronic device 100 may receive touch inputs with respect to the front portion 500 and the edge portion 520. The electronic device 100 may also receive a hovering input with respect to a peripheral region 1030 around the electronic device 100.

The front portion 500 of the electronic device 100 may include a consonant keyboard region 1010. The edge portion 520 of the electronic device 100 may include a vowel keyboard region 1020. The consonant keyboard region 1010 and the vowel keyboard region 1020 may further include a space button, a Korean/English change button, a symbol/numeral change button, and the like.

According to an embodiment of the present disclosure, the consonant keyboard region 1010 may include at least one button for inputting consonants. According to an embodiment of the present disclosure, each button may include three consonants.

According to an embodiment of the present disclosure, each button included in the consonant keyboard region 1010 may include a first consonant, a second consonant, and a third consonant. In response to a touch input with respect to a button included in the consonant keyboard region 1010, the electronic device 100 may output a first consonant included in the button.

In response to a touch input with respect to a button included in the consonant keyboard region 1010 and a touch input with respect to the edge portion 520 of the electronic device 100, the electronic device 100 may output a second consonant included in the button.

In response to a touch input with respect to a button included in the consonant keyboard region 1010 and a hovering input with respect to the peripheral region 1030 around the electronic device 100, the electronic device 100 may output a third consonant included in the button.

In response to a touch input with respect to a button included in the consonant keyboard region 1010, a touch input with respect to the edge portion 520 of the electronic device 100, and a hovering input with respect to the peripheral region 1030 around the electronic device 100, the electronic device 100 may also output a third consonant included in the button.

For example, the consonant keyboard region 1010 may include a button 1012 including consonants "ㄷ", "ㄸ", and "ㅌ". In response to a touch input with respect to the button 1012, the electronic device 100 may output the consonant "ㄷ".

In response to a touch input with respect to the button 1012 and a touch input with respect to the edge portion 520 of the electronic device 100, the electronic device 100 may output the consonant "ㄸ". In response to the touch input with respect to the button 1012 and a hovering input with respect to the peripheral region 1030 around the electronic device 100, the electronic device 100 may output the consonant "ㅌ".

According to another embodiment of the present disclosure, in response to a touch input with respect to a button included in the consonant keyboard region 1010, a touch input with respect to the edge portion 520 of the electronic device 100, and a hovering input with respect to the peripheral region 1030 around the electronic device 100, the electronic device 100 may output a preset word or sentence.

For example, the user may store frequently-used words or sentences in the electronic device 100 and may designate each button included in the consonant keyboard region 1010 as a keyboard shortcut. The user may store a word "특히" in the electronic device 100 and designate the button 1012 as a keyboard shortcut.

Thereafter, when the user performs a touch input with respect to the button 1012, a touch input with respect to the edge portion 520, and a hovering input with respect to the peripheral region 1030, the electronic device 100 may output the word "특히".

According to an embodiment of the present disclosure, the vowel keyboard region 1020 may include at least one button for inputting vowels. According to an embodiment of the present disclosure, the buttons may respectively include vowels "ㅣ", "•", and "-" necessary for inputting vowels. However, the type of button used to input a vowel is not limited thereto.

According to an embodiment of the present disclosure, the edge portion 520 of the electronic device 100 may include a region 1025 not included in the vowel keyboard region 1020.

In response to a touch input with respect to a button included in the consonant keyboard region 1010 and a touch input with respect to the region 1025 included in the edge portion 520 of the electronic device 100, the electronic device 100 may output a second consonant included in the button.

In response to the touch input with respect to the button included in the consonant keyboard region 1010 and a touch input with respect to a button representing a first vowel, included in the vowel keyboard region 1020 of the electronic device 100, the electronic device 100 may output the second consonant and the first vowel together.

For example, when the user performs a touch input with respect to a button 1011 included in the consonant keyboard region 1010 and a touch input with respect to the region 1025 included in the edge portion 520, the electronic device 100 may output a consonant "ㄲ".

When the user performs the touch input with respect to the button 1011 included in the consonant keyboard region 1010 and a touch input with respect to a button 1021 included in the vowel keyboard region 1020, the electronic device 100 may output "끼".

In response to the touch input with respect to the button included in the consonant keyboard region 1010, the touch input with respect to the button representing the first vowel, included in the vowel keyboard region 1020, and a hovering input with respect to the peripheral region 1030 around the electronic device 100, the electronic device 100 may output a third consonant and the first vowel together.

For example, when the user performs the touch input with respect to the button 1011 included in the consonant keyboard region 1010, the touch input with respect to the region 1025 included in the edge portion 520, and the hovering input with respect to the peripheral region 1030, the electronic device 100 may output a consonant "ㅋ".

When the user performs the touch input with respect to the button 1011 included in the consonant keyboard region 1010, the touch input with respect to the button 1021 included in the vowel keyboard region 1020, and the hovering input with respect to the peripheral region 1030, the electronic device 100 may output "키".

For example, to input the word "특히", the user may input "트" by performing a touch input with respect to the button 1012 included in the consonant keyboard region 1010, a touch input with respect to a button 1023 included in the vowel keyboard region 1020, and the hovering input with respect to the peripheral region 1030.

The user may also input a consonant "ㄱ" by performing the touch input with respect to the button 1011 included in the consonant keyboard region 1010.

The user may also input "ㅎ ·" by performing touch inputs with respect to a button 1013 included in the consonant keyboard region 1010 and a button 1022 included in the vowel keyboard region 1020 and performing the hovering input with respect to the peripheral region 1030.

The user may also input the vowel "ㅣ" by performing the touch input with respect to the button 1021 included in the vowel keyboard region 1020.

Referring to FIG. 10, the user may input the word "특히" via four touch inputs.

Figure 11:
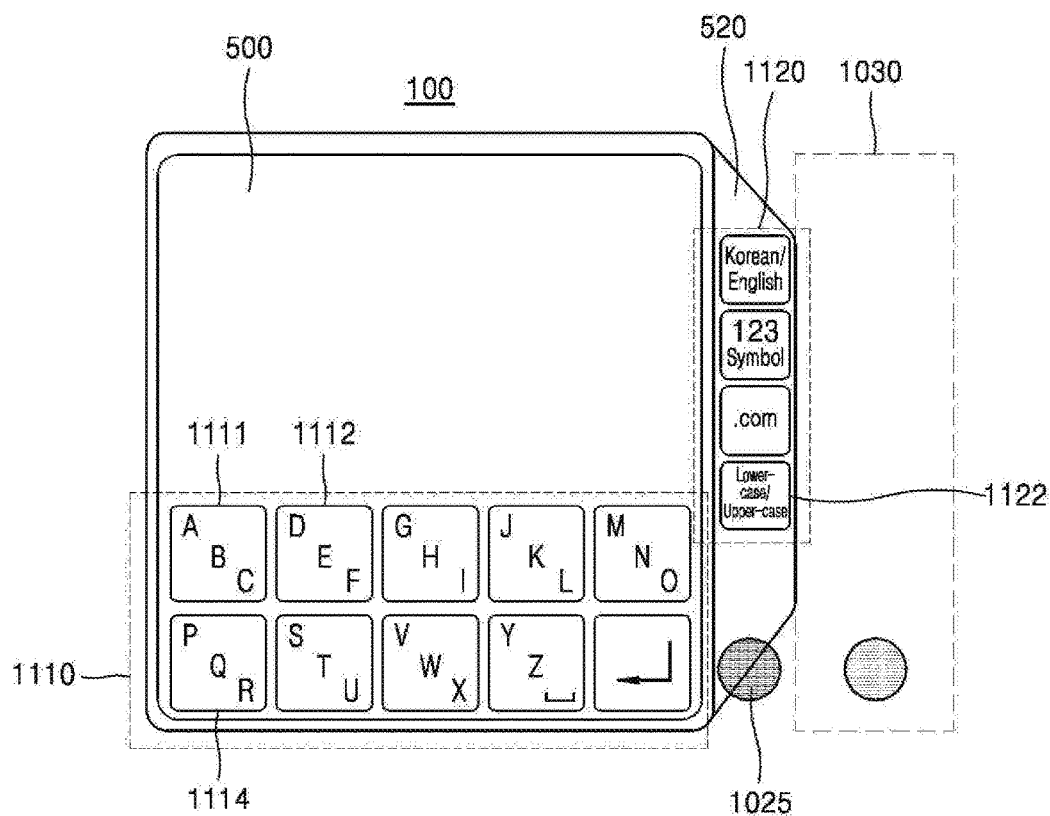
FIG. 11 illustrates a method of inputting English alphabet letters by using an electronic device that performs a plurality of touch inputs according to an embodiment of the present disclosure.

FIG. 11 illustrates a method of inputting English alphabets by using an electronic device that performs a plurality of touch inputs according to an embodiment of the present disclosure.

Referring to FIG. 11, the electronic device 100 may include the front portion 500 and the edge portion 520. The electronic device 100 may receive touch inputs with respect to the front portion 500 and the edge portion 520. The electronic device 100 may also receive a hovering input with respect to a peripheral region 1030 around the electronic device 100.

The front portion 500 of the electronic device 100 may include an alphabet input region 1110. The edge portion 520 of the electronic device 100 may include an additional input region 1120. The additional input region 1120 may include a Korean/English change button, a symbol/numeral change button, and the like. The alphabet input region 1110 and the additional input region 1120 may further include a space button and a symbol button.

According to an embodiment of the present disclosure, the alphabet input region 1110 may include at least one button for inputting an alphabet. According to an embodiment of the present disclosure, each button may include three alphabets.

According to an embodiment of the present disclosure, each button included in the alphabet input region 1110 may include a first alphabet, a second alphabet, and a third alphabet. In response to a touch input with respect to a button included in the alphabet input region 1110, the electronic device 100 may output a first alphabet included in the button.

In response to a touch input with respect to a button included in the alphabet input region 1110 and a touch input with respect to the edge portion 520 of the electronic device 100, the electronic device 100 may output a second alphabet included in the button.

In response to a touch input with respect to a button included in the alphabet input region 1110 and a hovering input with respect to the peripheral region 1030 around the electronic device 100, the electronic device 100 may output a third alphabet included in the button.

In response to a touch input with respect to a button included in the alphabet input region 1110, a touch input with respect to the edge portion 520 of the electronic device 100, and a hovering input with respect to the peripheral region 1030 around the electronic device 100, the electronic device 100 may also output a third alphabet included in the button.

For example, the alphabet input region 1110 may include a button 1111 including "A", "B" and "C". In response to a touch input with respect to the button 1111, the electronic device 100 may output "a".

In response to the touch input with respect to the button 1111 and the touch input with respect to the edge portion 520 of the electronic device 100, the electronic device 100 may output "b". In response to the touch input with respect to the button 1111 and the hovering input with respect to the peripheral region 1030 around the electronic device 100, the electronic device 100 may output "c".

According to another embodiment of the present disclosure, in response to a touch input with respect to a button included in the alphabet input region 1110, a touch input with respect to the edge portion 520 of the electronic device 100, and a hovering input with respect to the peripheral region 1030 around the electronic device 100, the electronic device 100 may output a preset word or sentence.

For example, the user may store frequently-used words or sentences in the electronic device 100 and may designate each button included in the alphabet input region 1110 as a keyboard shortcut. The user may store a word "PATENT" in the electronic device 100 and designate a button 1114 as a keyboard shortcut.

Thereafter, when the user performs the touch input with respect to the button 1114, the touch input with respect to the edge portion 520, and the hovering input with respect to the peripheral region 1030, the electronic device 100 may output "PATENT".

According to an embodiment of the present disclosure, the additional input region 1120 may include an upper-case/lower-case change button 1122. For example, in response to a touch input with respect to the button 1122, the electronic device 100 may represent that the upper-case/lower-case change button 1122 has been activated. For example, the electronic device 100 may display the upper-case/lower-case change button 1122 in a different color to the other buttons.

When the user touches a button included in the alphabet input region 1110, the electronic device 100 may output an upper-case alphabet. According to an embodiment of the present disclosure, when one alphabet is input, the upper-case/lower-case change button 1122 may be deactivated.

For example, the user may perform a touch input with respect to the button 1112 after performing a touch input with respect to the upper-case/lower-case change button 1122. In this case, the electronic apparatus 100 may output an upper-case alphabet "D".

According to an embodiment of the present disclosure, in response to the touch input with respect to the upper-case/lower-case change button 1122 and the hovering input with respect to the peripheral region 1030, the electronic device 100 may fix the upper-case/lower-case change button 1122 to an activated state. For example, until the touch input with respect to the upper-case/lower-case change button 1122 is received again, when the user touches a button included in the alphabet input region 1110, the electronic device 100 may output an upper-case alphabet.

According to an embodiment of the present disclosure, the user may simultaneously perform a touch input with respect to a button included in the alphabet input region 1110 and a touch input with respect to the upper-case/lower-case change button 1122. In the present specification, two operations being performed simultaneously may mean that both the two operations are performed within a preset time period.

For example, the user may simultaneously perform the touch input with respect to the button 1112 and the touch input with respect to the upper-case/lower-case change button 1122. In this case, the electronic apparatus 100 may output an upper-case alphabet "E".

As another example, the user may simultaneously perform the touch input with respect to the button 1112, the touch input with respect to the upper-case/lower-case change button 1122, and the hovering input with respect to the peripheral region 1030. In this case, the electronic apparatus 100 may output an upper-case alphabet "F".

According to an embodiment of the present disclosure, the edge portion 520 of the electronic device 100 may include a region 1025 not included in the additional input region 1120.

In response to a touch input with respect to a button included in the alphabet input region 1110 and a touch input with respect to the region 1025 included in the edge portion 520 of the electronic device 100, the electronic device 100 may output a second alphabet included in the button.

For example, the user may simultaneously perform the touch input with respect to the button 1112 and the touch input with respect to the region 1025. In this case, the electronic apparatus 100 may output a lower-case alphabet "e".

Figure 12:
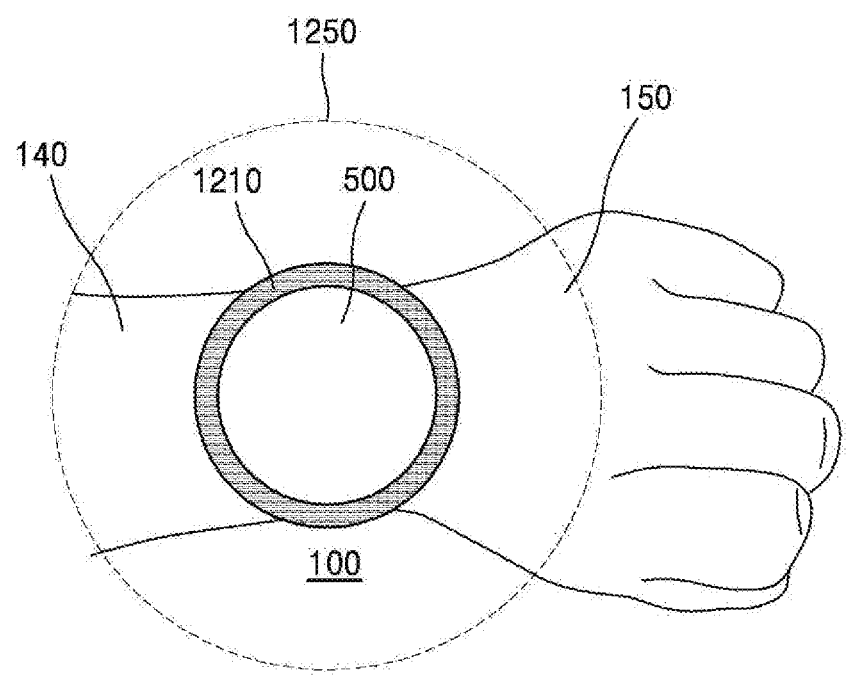
FIG. 12 illustrates an example of an electronic device including no edges according to an embodiment of the present disclosure.

FIG. 12 illustrates an example of an electronic device including no edge portions according to an embodiment of the present disclosure.

Referring to FIG. 12, according to an embodiment of the present disclosure, when the electronic device 100 has a circular shape, the electronic device 100 may include no edge portions. According to another embodiment of the present disclosure, even when the electronic device 100 has a quadrilateral shape, the electronic device 100 may include no edge portions.

The electronic device 100 including no edge portions may receive a hovering input with respect to a peripheral region 1250 around the electronic device 100 by using a bezel 1210. The electronic device 100 may include at least one of a touch panel, one or more sensors, and one or more cameras in the bezel 1210.

According to an embodiment of the present disclosure, when the electronic device 100 has a circular shape, the electronic device 100 may split the peripheral region 1250 according to angles. For example, the electronic device 100 may split the peripheral region 1250 at right angles and may receive hovering inputs with respect to four peripheral regions obtained via the splitting.

According to another embodiment of the present disclosure, the electronic device 100 may distinguish and receive a hovering input with respect to the back of the hand 150, a hovering input with respect to the wrist 140, and hovering inputs with respect to the other regions.

Figure 13:
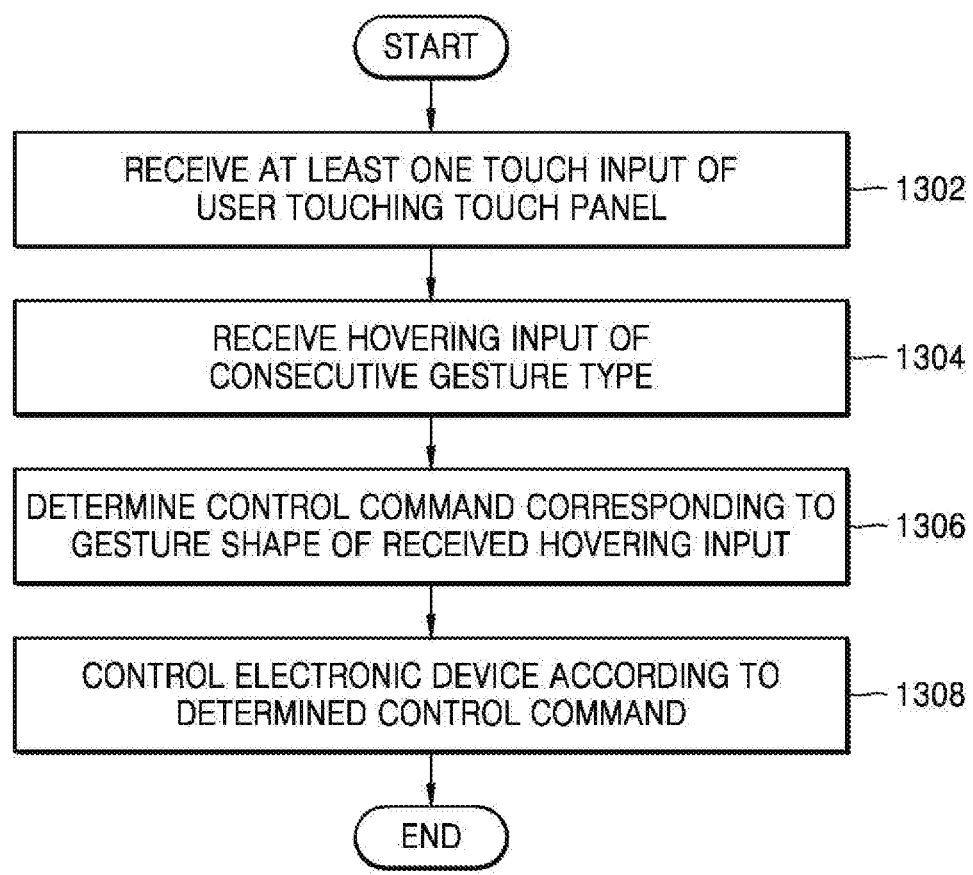
FIG. 13 is a flowchart of a method of controlling an electronic device that receives a consecutive gesture type of hovering input, according to an embodiment of the present disclosure.

FIG. 13 is a flowchart of a method of controlling an electronic device that receives a hovering input according to an embodiment of the present disclosure. The method of FIG. 13 is an embodiment of the method of FIG. 2. Accordingly, although omitted, descriptions of the embodiment of FIG. 2 also apply to the embodiment of FIG. 13.

Referring to FIG. 13, in operation 1302, the electronic device 100 may receive at least one touch input of a user touching the touch panel.

In operation 1304, the electronic device 100 may receive a consecutive gesture type of hovering input. According to an embodiment of the present disclosure, the electronic device 100 may receive a consecutive gesture type of hovering input during a preset time period. Gesture types that may be received by the electronic device 100 may include tap, touch and hold, double tap, drag, panning, flick, drag and drop, swipe, and the like.

In operation 1306, the electronic device 100 may determine a control command corresponding to the gesture shape of the hovering input. According to an embodiment of the present disclosure, when a gesture-type hovering input is received and there are no control commands corresponding to the gesture-type hovering input, the electronic device 100 may ignore the received hovering input.

In operation 1308, the electronic device 100 may be controlled according to the determined control command.

Figure 14:
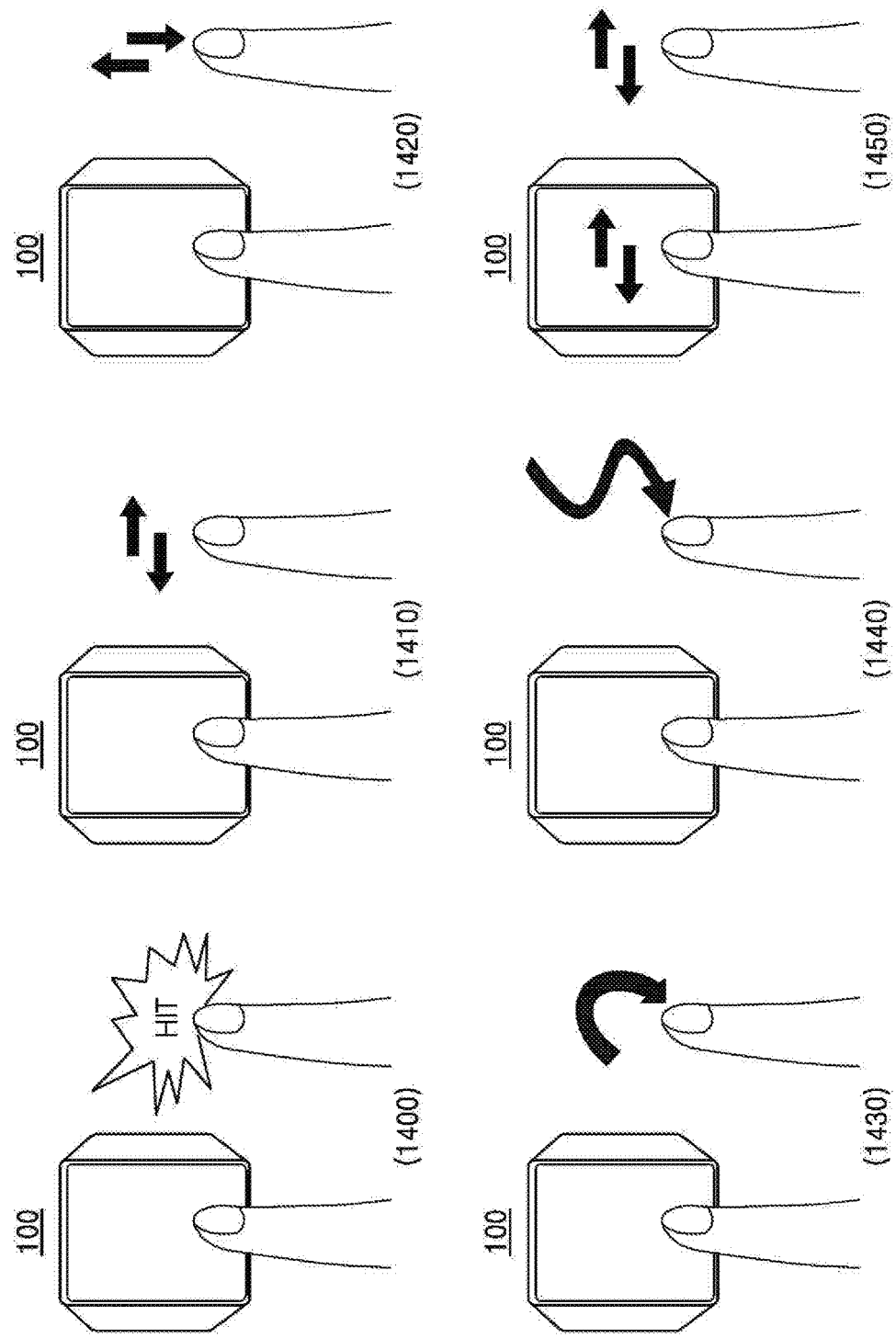
FIG. 14 illustrates examples of a consecutive gesture type of hovering input according to an embodiment of the present disclosure.

FIG. 14 illustrates examples of a hovering input according to an embodiment of the present disclosure.

Referring to FIG. 14, the electronic device 100 may receive various gesture types of hovering inputs. The gesture-types of hovering inputs shown in FIG. 14 are only examples, and the types of gesture-type hovering inputs that may be received by the electronic device 100 are not limited thereto.

Referring to FIG. 14, the electronic device 100 may receive a hovering input of touching a peripheral region around the electronic device 100.

As indicated by reference numerals 1410-1450, the electronic device 100 may receive a consecutive gesture type of hovering input from the peripheral region.

The electronic device 100 may also receive a horizontal flick hovering input 1410 and a vertical flick hovering input 1420 from the peripheral region.

The electronic device 100 may also receive a hovering input 1430 of drawing a circle and an S-shaped hovering input 1440 from the peripheral region.

The electronic device 100 may implement a multi-touch function 1450 by mixing a touch input received from a finger touching the electronic device 100 with a hovering input received from a finger touching the peripheral region around the electronic device 100.

For example, the electronic device 100 may receive a slide input whereby the finger touching the electronic device 100 moves in one direction. Simultaneously, the electronic device 100 may receive a hovering input in which the finger touching the peripheral region moves in an opposite direction to the direction of the slide input.

In this case, the electronic device 100 may enlarge or shrink the size of a screen image displayed on the electronic device 100. For example, the electronic device 100 may shrink the screen image in response to an input in which two fingers are drawn closer to each other. The electronic device 100 may enlarge the screen image in response to an input in which two fingers are spread out apart from each other.

Figure 15:
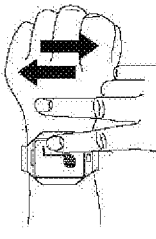
FIG. 15 is a table showing an example of a method of determining a control command corresponding to a combination of a touch input and a gesture type hovering input according to an embodiment of the present disclosure.
Figure 15:
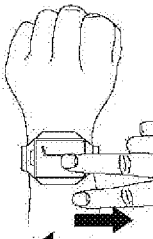
Figure 15:
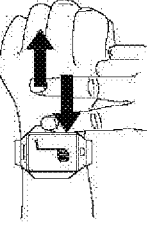
Figure 15:
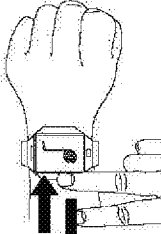

FIG. 15 is a table showing an example of a method of determining a control command corresponding to a combination of a touch input and a gesture type hovering input according to an embodiment of the present disclosure.

Referring to FIG. 15, the electronic device 100 may receive a touch input of the user. Referring to a table 1500 of FIG. 15, the electronic device 100 may receive at least one of a touch input with respect to a front side 1520 and a touch input with respect to an edge 1530.

The electronic device 100 may receive a hovering input of the user. Referring to FIG. 15, the electronic device 100 may receive at least one of a hovering input with respect to the back of a hand 1540 and a hovering input with respect to a wrist 1550.

The electronic device 100 may determine a control command corresponding to a combination of the touch input and the hovering input. Referring to FIG. 15, functions 1510 that may be determined by the electronic device 100 may include functions 1510 for performing a volume adjustment function 1511, a brightness adjustment function 1512, a font change function 1513, and a zooming function 1514.

The electronic device 100 may receive a touch input of the user touching the front side 1520 and may receive a vertical flick hovering input of the user with respect to the back of a hand 1540 within a preset time period starting from the touch input. In this case, the electronic device 100 may adjust the volume.

The electronic device 100 may receive a touch input of the user touching the front side 1520 and may receive a vertical flick hovering input of the user with respect to the wrist 1550 within a preset time period starting from the touch input. In this case, the electronic device 100 may adjust the brightness.

The electronic device 100 may receive a touch input of the user touching the edge 1530 and may receive a horizontal flick hovering input of the user with respect to the back of a hand 1540 within the preset time period starting after the touch input. In this case, the electronic device 100 may change the font.

The electronic device 100 may receive the touch input of the user touching the edge 1530 and may receive a horizontal flick hovering input of the user with respect to the wrist 1550 within the preset time period starting after the touch input. In this case, the electronic device 100 may perform a zoom function of magnifying the size of the screen image or an image captured by a camera.

According to an embodiment of FIG. 15 of the present disclosure, the electronic device 100, as illustrated in column 1560 of the table 1500, may be a wearable device that is worn by the user, and the hovering input may be an input of touching a body part of the user around the electronic device 100.

Figure 16:
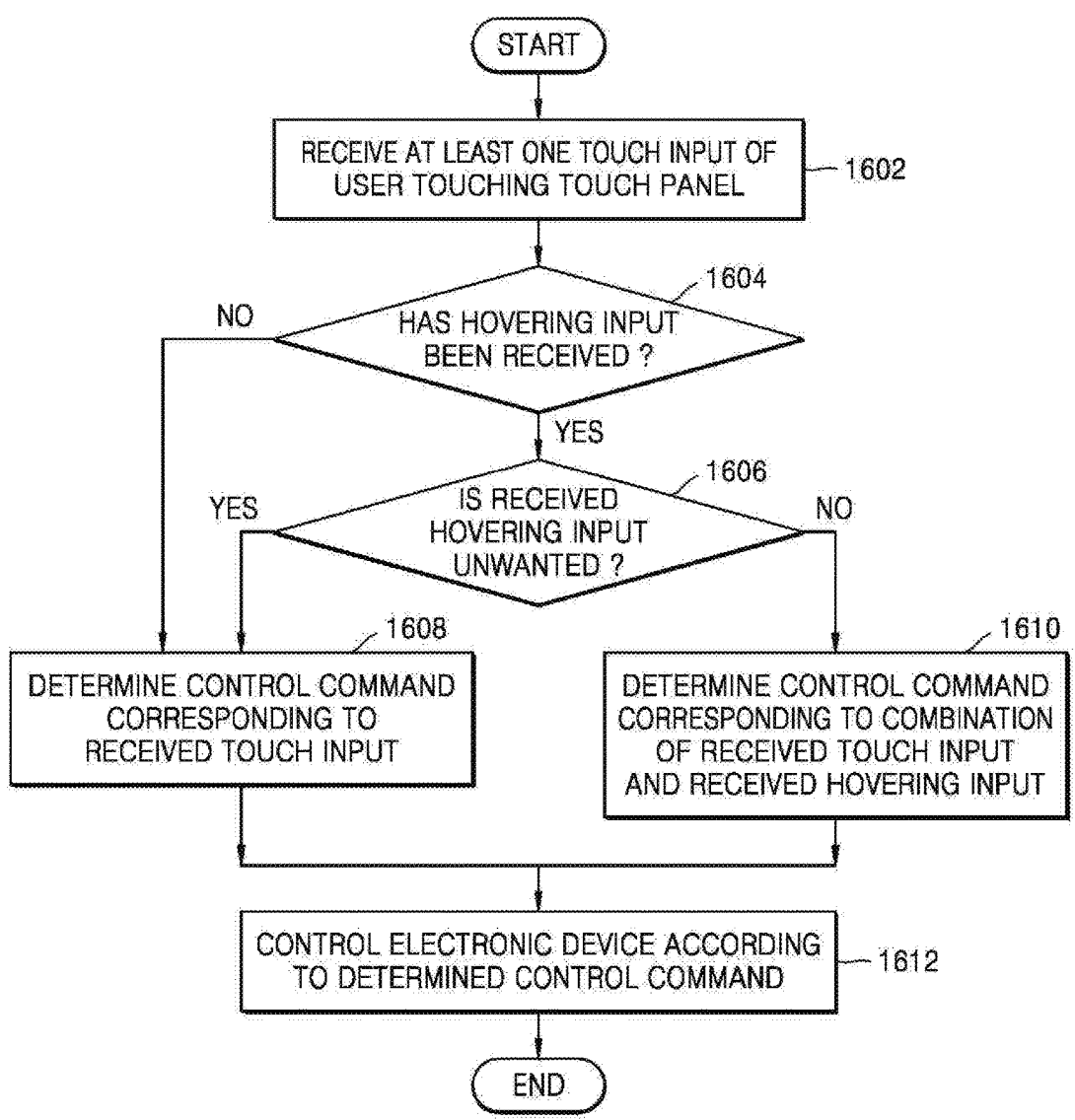
FIG. 16 is a flowchart of an example of a method of excluding an unwanted hovering input according to an embodiment of the present disclosure.

FIG. 16 is a flowchart of an example of a method of excluding an unwanted hovering input according to an embodiment of the present disclosure. The method of FIG. 16 is an embodiment of the method of FIG. 2. Accordingly, although omitted, descriptions of the embodiment of FIG. 2 also apply to the embodiment of FIG. 16.

Referring to FIG. 16, in operation 1602, the electronic device 100 may receive at least one touch input of a user touching the touch panel.

In operation 1604, the electronic device 100 may determine whether a hovering input has been received. According to an embodiment of the present disclosure, the electronic device 100 may ignore a hovering input that is received after a preset time period after the touch input has been received. According to another embodiment of the present disclosure, the electronic device 100 may not receive a hovering input unless the electronic device 100 receives a touch input.

In many cases, an unwanted hovering input or a wrong hovering input may be generated. The electronic device 100 may receive a hovering input that is consistent with the intention of the user, by selectively receiving a hovering input.

When no hovering inputs are received, the electronic device 100 may perform operation 1608. When a hovering input has been received, the electronic device 100 may perform operation 1606.

In operation 1606, the electronic device 100 may determine whether the received hovering input is unwanted.

When it is determined that an unwanted hovering input has been received, the electronic device 100 may perform operation 1608.

On the other hand, when it is determined that a hovering input conforming to an intention of the user has been received, the electronic device 100 may perform operation 1610.

In operation 1608, the electronic device 100 may determine a control command corresponding to the received touch input. Since the hovering input conforming to an intention of the user has not been received, the electronic device 100 determines the control command corresponding to the received touch input.

In operation 1610, the electronic device 100 may determine a control command corresponding to a combination of the received touch input and the received hovering input. By determining a control command corresponding to the hovering input conforming to an intention of the user, the electronic device 100 may perform an operation desired by the user.

In operation 1612, the electronic device 100 may be controlled according to the determined control command.

Figure 17:
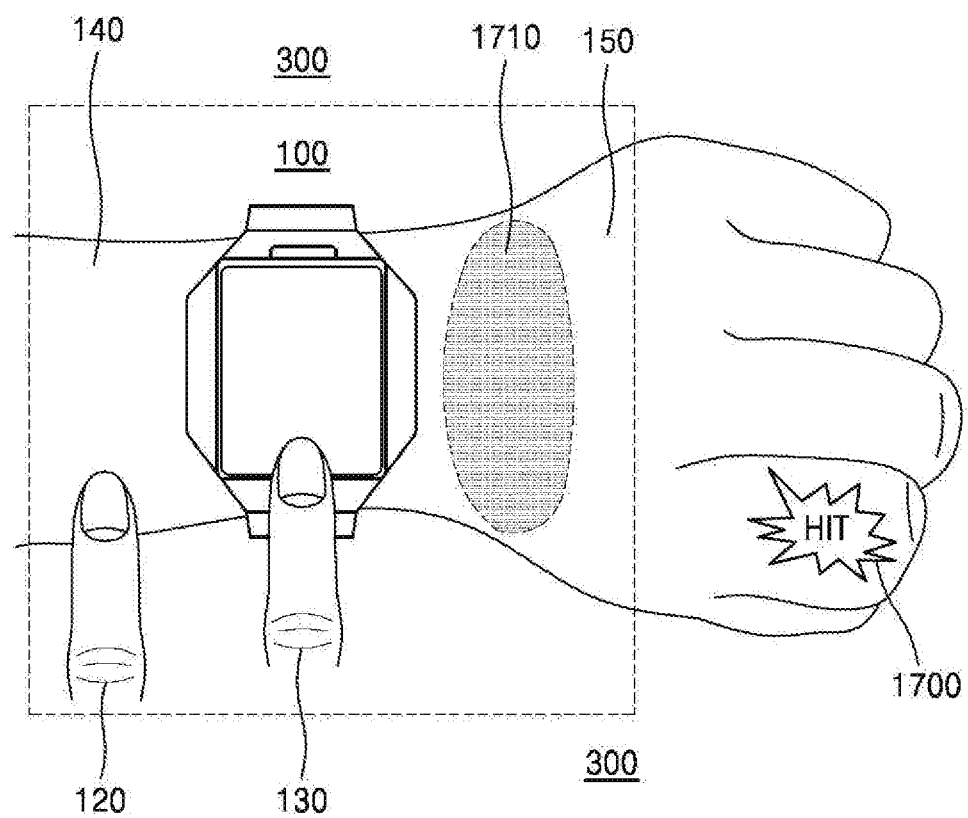
FIG. 17 illustrates an example of an unwanted hovering input according to an embodiment of the present disclosure.

FIG. 17 illustrates an example of an unwanted hovering input according to an embodiment of the present disclosure.

Referring to FIG. 17, the electronic device 100 may be a wearable device that is worn by a user.

The peripheral region 300, from which the electronic device 100 receives a hovering input, may represent a maximum range in which the electronic device is able to sense a hovering input, or may represent a region previously set by the user.

The electronic device 100 may receive a hovering input with respect to a first location 1700 within a preset time period after a touch input by the second finger 130 has been received. The electronic device 100 may sense a distance to the first location 1700. When it is determined that the first location 1700 is outside the peripheral region 300, the electronic device 100 may determine that the hovering input with respect to the first location 1700 is an unwanted hovering input.

The electronic device 100 may receive a hovering input generated by the first finger 120. The electronic device 100 may receive a consecutive gesture type of hovering input. When there are no control commands corresponding to the received gesture type hovering input, the electronic device 100 may determine that an unwanted hovering input has been received.

The electronic device 100 may also receive a hovering input with respect to a wrist 1710. For example, when the user bends the wrist 1710 upwards such that the wrist 1710 is directed to the electronic device 100, a touch panel, a sensor, or a camera located on a right edge portion of the electronic device 100 may sense the bent wrist, and thus the electronic device 100 may receive a hovering input.

The electronic device 100 may determine a range in which a hovering input is received. When the range in which a hovering input is received is equal to or greater than a preset critical value, the electronic device 100 may determine that an unwanted hovering input based on a motion of the wrist 1710 has been received.

Referring back to FIG. 16, when it is determined that an unwanted hovering input has been received, the electronic device 100 may perform operation 1608.

On the other hand, when it is determined that a hovering input conforming to an intention of the user has been received, the electronic device 100 may perform operation 1610.

In operation 1608, the electronic device 100 may determine a control command corresponding to the received touch input. Since the hovering input conforming to an intention of the user has not been received, the electronic device 100 determines the control command corresponding to the received touch input.

In operation 1610, the electronic device 100 may determine a control command corresponding to a combination of the received touch input and the received hovering input. By determining a control command corresponding to the hovering input conforming to an intention of the user, the electronic device 100 may perform an operation desired by the user.

In operation 1612, the electronic device 100 may be controlled according to the determined control command.

Figure 18:
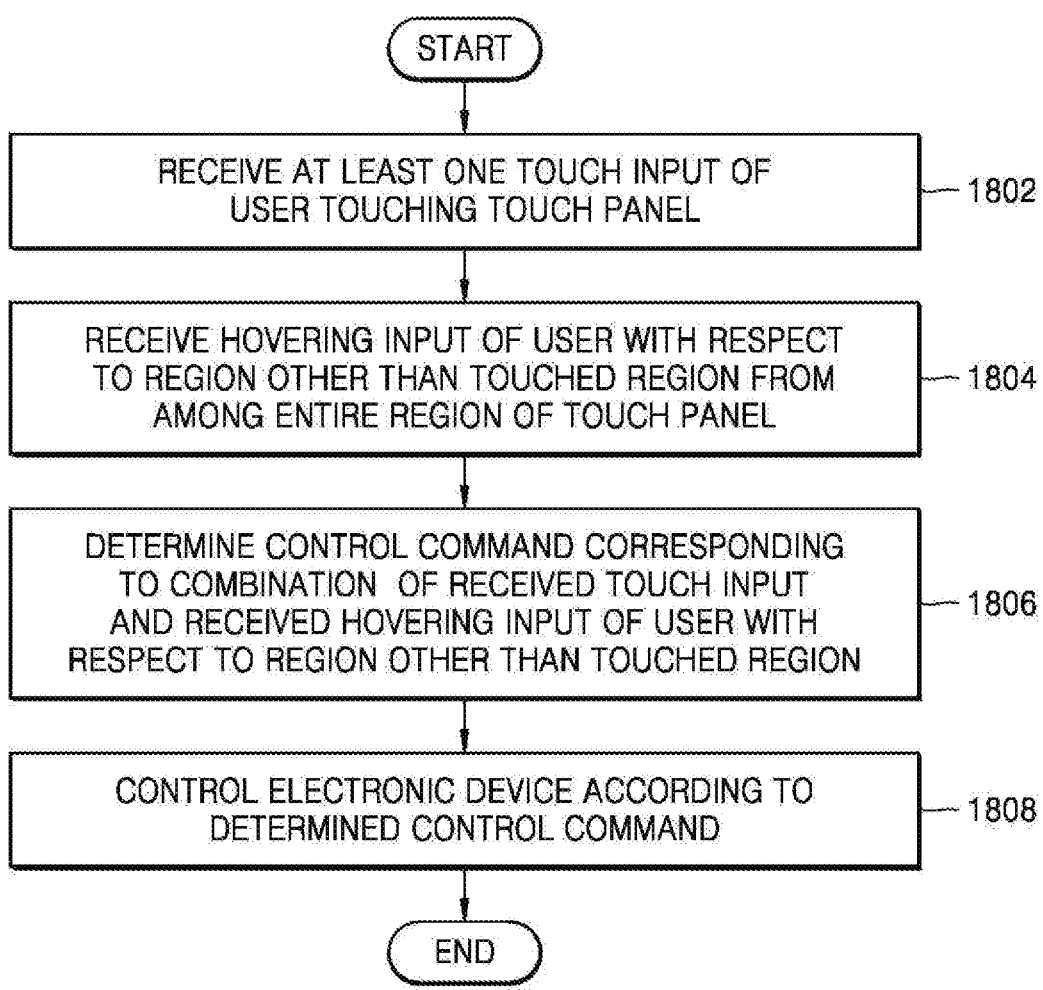
FIG. 18 is a flowchart of a method of controlling an electronic device that receives a hovering input with respect to a touch panel region, according to an embodiment according to an embodiment of the present disclosure.

FIG. 18 is a flowchart of a method of controlling an electronic device that receives a hovering input with respect to a touch panel region, according to an embodiment of the present disclosure. The method of FIG. 18 is an embodiment of the method of FIG. 2. Accordingly, although omitted, descriptions of the embodiment of FIG. 2 also apply to the embodiment of FIG. 18.

Referring to FIG. 18, in operation 1802, the electronic device 100 may receive at least one touch input of a user touching the touch panel.

In operation 1804, the electronic device 100 may receive a hovering input of the user with respect to a region other than a touched region from among the entire region of the touch panel. For example, the electronic device 100 may receive a hovering input generated by an object close to a region other than a touched region on a front portion of the touch panel.

In operation 1806, the electronic device 100 may determine a control command corresponding to a combination of the received touch input and the received hovering input of the user with respect to the region other than the touched region obtained via the received touch input.

In operation 1808, the electronic device 100 may be controlled according to the determined control command.

Figure 19:
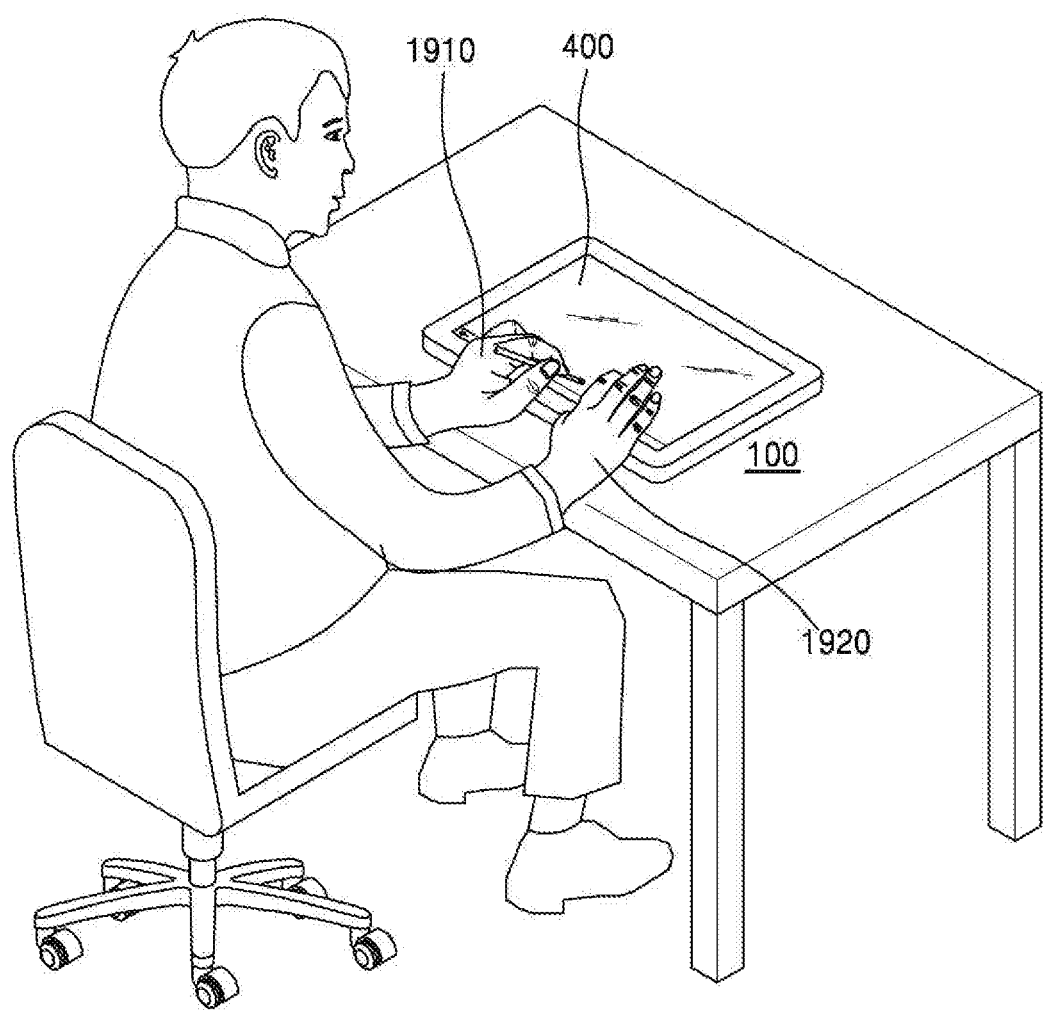
FIG. 19 is a schematic view for explaining a method of controlling an electronic device by using two hands according to an embodiment of the present disclosure.

FIG. 19 is a schematic view for explaining a method of controlling an electronic device by using two hands according to an embodiment of the present disclosure.

Referring to FIG. 19, the electronic device 100 may be a device easy to be manipulated with two hands, such as a tablet PC or a smart TV that may be used on a table.

According to an embodiment of the present disclosure, a user may touch the touch panel 400 of the electronic device 100 with a left hand 1910 or a touch pen held by the left hand 1910.

The electronic device 100 may receive a hovering input of the user with respect to a region other than a region touched via a touch input from among the entire region of the touch panel, within a preset time period after the touch input has been received. For example, the user may perform a hovering input with respect to a region other than a region touched by the right hand 1920, within a preset time period after the touch panel 400 has been touched by the left hand 1910.

The user may perform a hovering input of moving the right hand 1920 vertically and horizontally. The user may also perform a hovering input of changing the height of the right hand 1920.

For example, the electronic device 100 may receive a touch input of touching a picture that is displayed on the electronic device 100 by using the left hand 1910. Within a preset time period after the touch input has been received, the electronic device 100 may receive a hovering input of moving the right hand 1920 upwards. In this case, the electronic device 100 may enlarge the picture and display the enlarged picture.

Within the preset time period after the touch input has been received, the electronic device 100 may also receive a hovering input of moving the right hand 1920 downwards. In this case, the electronic device 100 may shrink the picture and display the shrunk picture.

According to another embodiment of the present disclosure, the electronic device 100 may receive a touch input of touching a web page that is displayed on the electronic device 100 by using the left hand 1910. Within a preset time period after the touch input has been received, the electronic device 100 may receive a hovering input of moving the right hand 1920 rightwards. In this case, the electronic device 100 may display a next page of the web page.

Within the preset time period after the touch input has been received, the electronic device 100 may also receive a hovering input of moving the right hand 1920 leftwards. In this case, the electronic device 100 may display a previous page of the web page.

Figure 20:
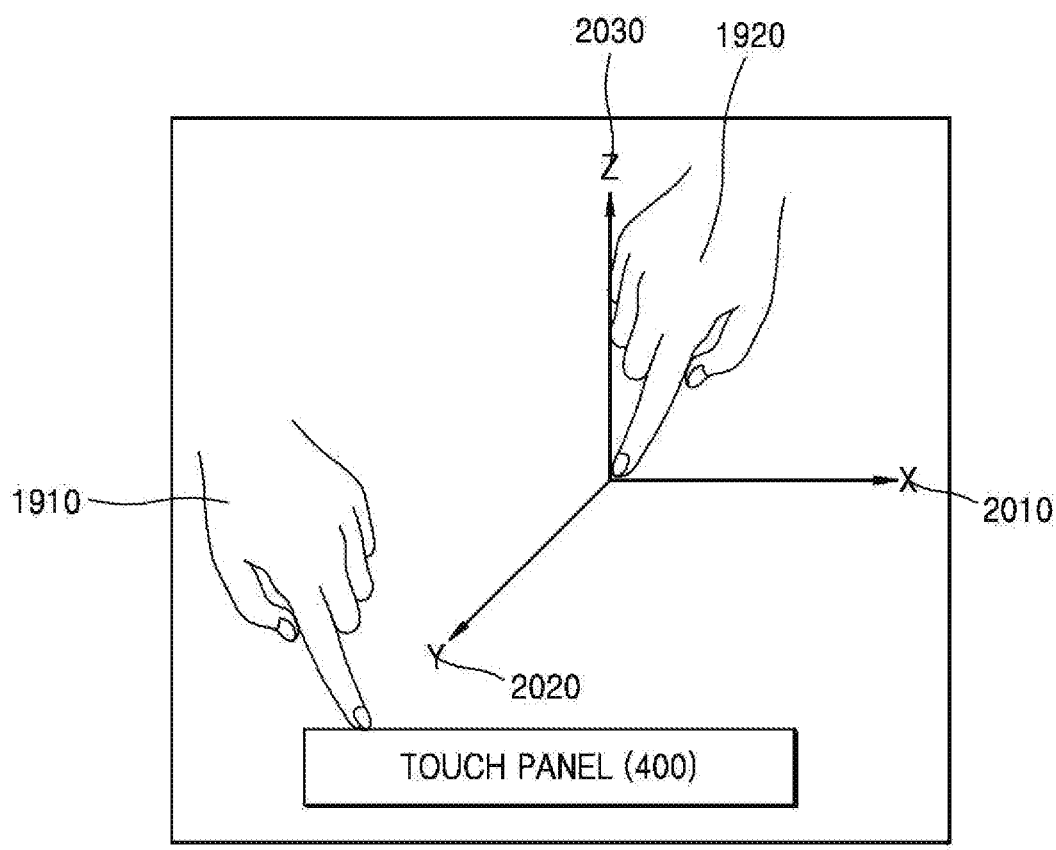
FIG. 20 illustrates details of a method of controlling an electronic device by using two hands according to an embodiment of the present disclosure.

FIG. 20 illustrates details of a method of controlling an electronic device by using two hands according to an embodiment of the present disclosure.

Referring to FIG. 20, the electronic device 100 may receive a touch input and a hovering input from a user by using the touch panel 400. For example, the touch panel 400 may receive a touch input of touching the touch panel 400 by using the left hand 1910.

The electronic device 100 may determine a location of the right hand 1920 at the moment when the touch input generated by the left hand 1910 is received. For example, a location of the right hand 1920 may be a relative location from the touch panel 400.

The electronic device 100 may receive a hovering input of the user by using as a reference location the location of the right hand 1920 determined at the moment when the touch input generated by the left hand 1910 is received.

For example, the electronic device 100 may sense the right hand 1920 moving from the reference location in an x-axis direction 2010, a y-axis direction 2020, and a z-axis direction 2030 by using the touch panel 400. The electronic device 100 may receive a hovering input by sensing the moving direction of the right hand 1920 or a gesture type in which the right hand 1920 moves.

According to an embodiment of the present disclosure, the right hand 1920 may not be sensed at the moment when the touch input generated by the left hand 1910 is received. According to another embodiment of the present disclosure, the reference location may be far from the touch panel 400 by a preset distance or more. In this case, the electronic device 100 may not receive a hovering input.

Even when the reference location is within the preset distance from the touch panel 400, the right hand 1920 may deviate from a range that may be sensed by the touch panel 400, or become farther from the touch panel 400 by a preset distance or more. In this case, the electronic device 100 may no more receive a hovering input.

Figure 21:
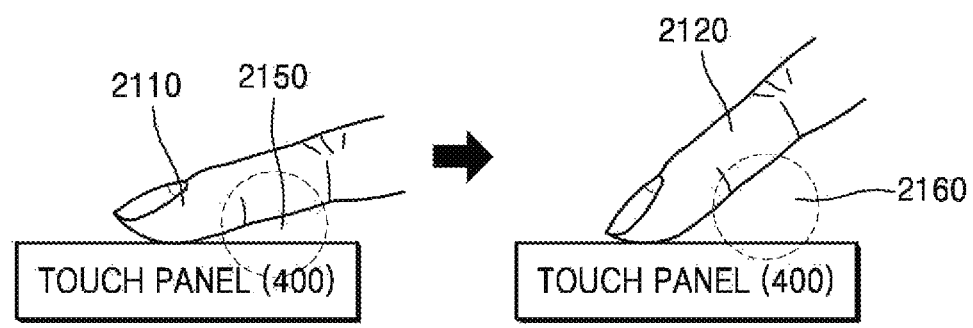
FIG. 21 illustrates a method of controlling an electronic device by using one hand according to an embodiment of the present disclosure.

FIG. 21 illustrates a method of controlling an electronic device by using one hand according to an embodiment of the present disclosure.

Referring to FIG. 21, the touch panel 400 may receive a touch input from a user.

According to an embodiment of the present disclosure, a finger that touches the touch panel 400 may take a first pose 2110 inclined close to the touch panel 400. In this case, the touch panel 400 may receive a touch input generated by the finger, and may sense a finger portion that does not touch the touch panel 400 within a first space 2150.

For example, the finger taking the first pose 2110 may be close to the touch panel 400, within the first space 2150.

Thereafter, while the finger keeps touching the touch panel 400, the finger may move to take a second pose 2120 inclined far from the touch panel 400.

In this case, the touch panel 400 may sense that a finger portion that does not touch the touch panel 400 becomes farther from the touch panel 400. For example, the finger taking the second pose 2120 may be far from the touch panel 400, within the second space 2160.

The touch panel 400 may sense that the finger becomes farther from the touch panel 400, and may receive a motion of changing the inclination of the finger as a hovering input. Accordingly, the electronic device 100 may receive the touch input with respect to the touch panel 400 and the hovering input generated by the finger portion that does not touch the touch panel 400.

The electronic device 100 may determine and execute a control command corresponding to the hovering input in which the inclination of the finger touching the touch panel 400 is changed.

Figure 22:
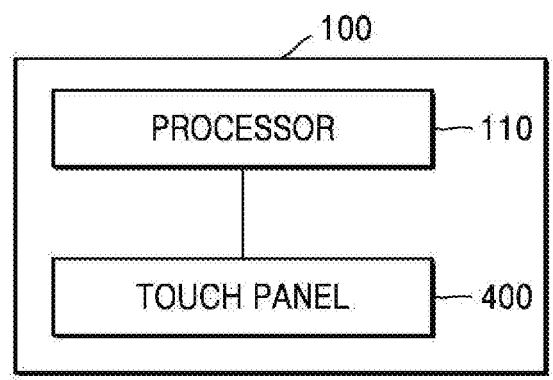
FIGS. 22 and 23 are block diagrams of an electronic device according to various embodiments of the present disclosure.
Figure 23:
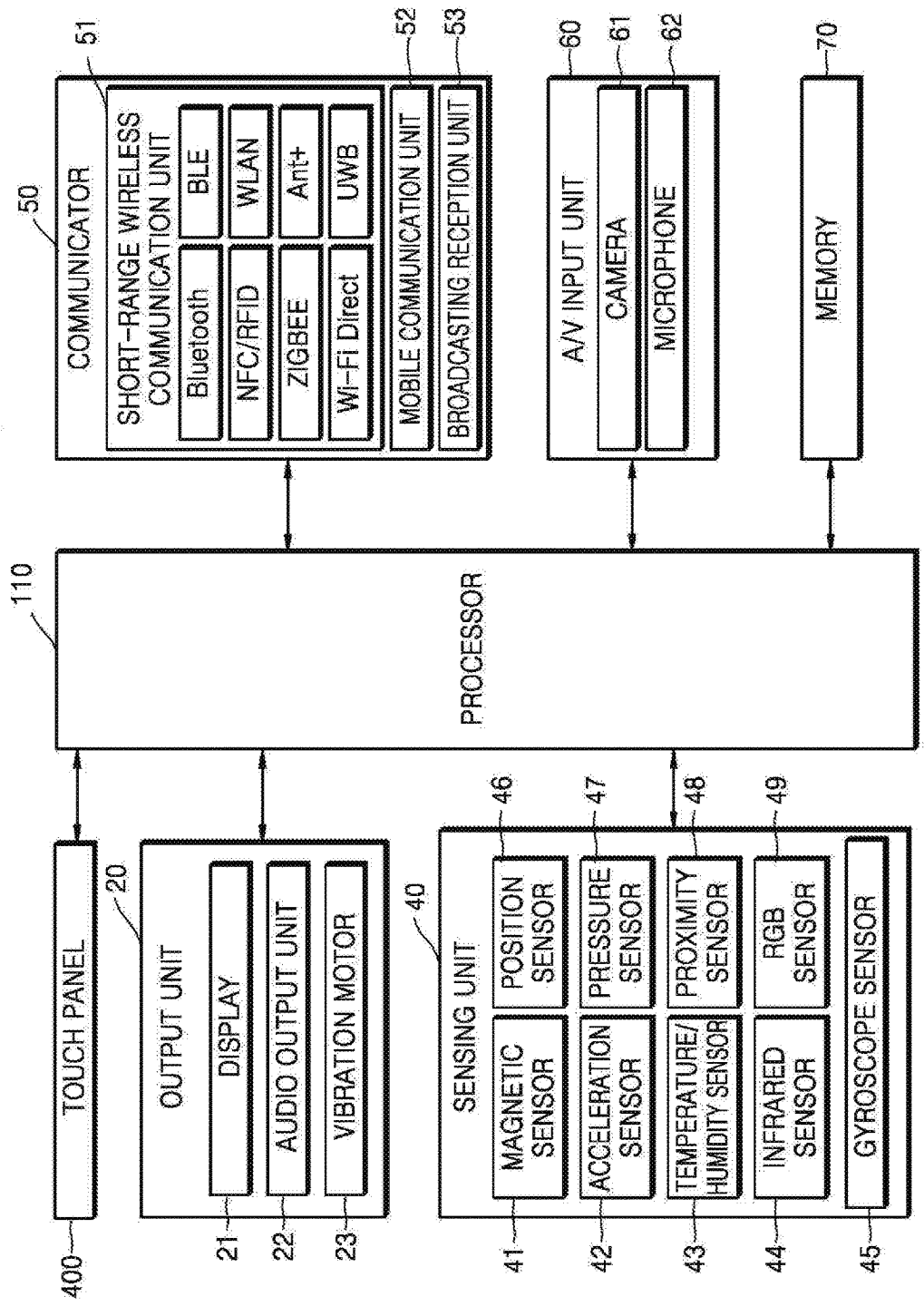

FIGS. 22 and 23 are block diagrams of an electronic device according to various embodiments of the present disclosure.

Referring to FIG. 22, the electronic device 100 according to an embodiment may include a processor 110 and the touch panel 400. The touch panel 400 may be a capacitive touch panel, a resistive touch panel, or the like, and may be a contact type touch panel or a non-contact type touch panel. The touch panel 400 may also be expressed as a touch pad.

All of the components illustrated in FIG. 22 are not essential components of the electronic device 100. More or less components than those illustrated in FIG. 22 may constitute the electronic device 100.

For example, referring to FIG. 23, the electronic device 100 may further include a sensing unit 40, an audio/video (A/V) input unit 60, and a memory 70, in addition to the touch panel 400, an output unit 20, the processor 110, and a communicator 50.

According to an embodiment of the present disclosure, the electronic device 100 may further include various units via which a user inputs data for controlling the electronic device 100. For example, the electronic device 100 may include, but is not limited to, a key pad, a dome switch, a touch panel (e.g., a capacitive overlay type, a resistive overlay type, an infrared beam type, an integral strain gauge type, a surface acoustic wave type, a piezo electric type, or the like), a jog wheel, or a jog switch.

The touch panel 400 may include a touch sensor and an electrode included in the touch sensor. The touch panel 400 may receive a touch input and a hovering input from a user.

The electronic device 100 may also include at least one sensor for receiving a hovering input. For example, the electronic device 100 may receive a hovering input by using at least one sensor included in the sensing unit 40. The electronic device 100 may use a camera 61 to receive a hovering input.

The output unit 20 may output an audio signal, a video signal, or a vibration signal, and may include a display 21, an audio output unit 22, and a vibration motor 23.

The display 21 displays information that is processed by the electronic device 100.

When the display 21 forms a layer structure together with the touch panel 400 to construct a touch screen, the display 21 may be used as an input device as well as an output device. The display 21 may include at least one of a liquid crystal display (LCD), a thin film transistor-LCD (TFT-LCD), an organic light-emitting diode (OLED), a flexible display, a three-dimensional (3D) display, and an electrophoretic display. According to various embodiments of the electronic device 100, the electronic device 100 may include at least two displays 21. The at least two displays 21 may be disposed to face each other by using a hinge.

The audio output unit 22 outputs audio data that is received from the communicator 50 or stored in the memory 70. The vibration motor 23 may output a vibration signal. For example, the vibration motor 23 may also output a vibration signal when a touch screen is touched.

The processor 110 typically controls all operations of the electronic device 100. For example, the processor 110 may control the touch panel 400, the output unit 20, the sensing unit 40, the communicator 50, the A/V input unit 60, and the like by executing programs stored in the memory 70.

In detail, the processor 110 may control the touch panel 400 to receive at least one touch input of the user. The processor 110 may receive a hovering input of the user with respect to a peripheral region around the electronic device 100, within a preset time period after the touch input is received. According to an embodiment of the present disclosure, the processor 110 may control the touch panel 400 or at least one sensor to receive a hovering input of the user.

The processor 110 may determine a control command corresponding to a combination of the received touch input and the received hovering input and may control the electronic device 100 according to the determined control command.

The sensing unit 40 may sense a state of the electronic device 100 or a state of the surrounding of the electronic device 100 and may transmit information corresponding to the sensed state to the processor 110. The electronic device 100 may receive a hovering input of the user by using the information corresponding to the sensed state.

The sensing unit 40 may include, but is not limited thereto, at least one selected from a magnetic sensor 41, an acceleration sensor 42, a temperature/humidity sensor 43, an infrared sensor 44, a gyroscope sensor 45, a position sensor (e.g., a global positioning system (GPS)) 46, a pressure sensor 47, a proximity sensor 48, and a red/green/blue (RGB) sensor 49 (i.e., an illumination sensor). Functions of most of the sensors would be instinctively understood by one of ordinary skill in the art in view of their names and thus detailed descriptions thereof will be omitted herein.

The communicator 50 may include a short-range wireless communication unit 51, a mobile communication unit 52, and a broadcasting reception unit 53. The A/V input unit 60 inputs an audio signal or a video signal, and may include, for example, the camera 61 and a microphone 62. The camera 61 may acquire an image frame, such as a still image or a moving picture, via an image sensor in a video call mode or a photography mode. An image captured via the image sensor may be processed by the processor 110 or a separate image processor (not shown).

The image frame obtained by the camera 61 may be stored in the memory 70 or transmitted to the outside via the communicator 50. At least two cameras 61 may be included according to various embodiments of the structure of a terminal. According to an embodiment of the present disclosure, the electronic device 100 may receive a hovering input of the user by using the image frame obtained by the camera 61.

The microphone 62 receives an external audio signal and converts the external audio signal into electrical audio data.

The memory 70 may store a program used by the processor 110 to perform processing and control, and may also store data that is input to or output from the electronic device 100.

In order to detect a touch input or a hovering input with respect to the touch panel 400, the touch panel 400 may internally or externally have various sensors. An example of a sensor used to detect a real touch or a proximity touch on the touch panel 400 is a tactile sensor. The tactile sensor denotes a sensor that detects a touch by a specific object to a degree to which a human feels or more. The tactile sensor may detect various types of information, such as the roughness of a touched surface, the hardness of the touching object, the temperature of a touched point, and the like.

Another example of a sensor used to detect a touch and hovering with respect to the touch panel 400 is a proximity sensor. The proximity sensor is a sensor that detects the existence of an object that approaches a predetermined detection surface or that exists nearby, by using an electromagnetic force or infrared rays, without using any mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like.

Another example of the proximity sensor is a noise touch sensor that senses a touch and hovering by using noise that is generated by an electric field that is carried all over the body of a user according to EMI within an environment.

The electronic device 100 may receive a hovering input of a consecutive gesture type by using a sensor. Examples of the touch gesture and the hovering gesture of the user may include tap, touch and hold, double tap, drag, panning, flick, drag and drop, swipe, and the like.

Panning may denote a motion of a user touching a touch screen with a finger and then dragging the finger on the touch screen without detaching the finger from the touch screen. Swipe may denote a motion of a user touching a touch screen with a finger and then dragging the finger on the touch screen in a straight line without time limits. A flick is a more restrictive action than a swipe, and may denote an action of a user that is similar to a swipe but involves quickly dragging a finger in one direction. The swipe and flick may be recognized as a panning action, and the flick may be recognized as a swipe. However, the above description is only an example, and the form of each action is not limited to the above description.

The above-described embodiments can be written as computer programs and can be implemented in general-use digital computers that execute the programs using a non-transitory computer readable medium. A structure of the data used in the above-described embodiments may be recorded in a computer readable medium via several means. The above-described embodiments can also be embodied as a storage medium including instruction codes executable by a computer such as a program module executed by the computer.

A computer readable medium can be any recording medium which can be accessed by the computer and includes all volatile/non-volatile and removable/non-removable media. Further, the computer readable medium may include all computer storage and communication media.

A plurality of computer readable recording media can be distributed over network coupled computer systems, and data stored in the distributed recording media, for example, program instruction words and codes, may be executed by at least one computer.

The particular implementations shown and described herein are merely illustrative embodiments and are not intended to otherwise limit the scope of various embodiments in any way. For the sake of brevity, electronics, control systems, software development and other functional aspects of the systems may not be described in detail.

The various embodiments should be considered in descriptive sense only and not for purposes of limitation. Descriptions of features or aspects within each embodiment should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a wearable electronic device including a touch panel, the method comprising:
   receiving, at the wearable electronic device, at least one first touch input via a front portion of the touch panel;
   receiving, at the wearable electronic device, at least one second touch input via an edge portion of the touch panel;
   receiving, at the wearable electronic device, a hovering input touching a body part of a user around the wearable electronic device;
   determining a control command corresponding to a combination of the at least one first touch input, the at least one second touch input, and the hovering input received at the wearable electronic device; and
   controlling the wearable electronic device according to the determined control command.

2. The method of claim 1,
   wherein the receiving of the hovering input comprises receiving the hovering input via at least one of a sensor, a camera, or a touch panel located on one side of the wearable electronic device.

3. The method of claim 1, wherein the at least one first touch input and the hovering input are generated from different regions provided in and around the wearable electronic device.

4. The method of claim 1, wherein the receiving of the hovering input comprises receiving a hovering input of a consecutive gesture type.

5. The method of claim 4, wherein the determining of the control command comprises determining a control command corresponding to a gesture of the hovering input.

6. The method of claim 1, further comprising:
    determining a first control command corresponding to the at least one first touch input and the at least one second touch input, based on the at least one first touch input and the at least one second touch input; and
    changing the first control command to a second control command in response to the hovering input.

7. A wearable electronic device for determining a control command, the wearable electronic device comprising:
    a touch panel configured to receive a first touch input via a front portion of the touch panel and a second touch input via an edge portion of the touch panel; and
    a processor configured to:
        receive a hovering input touching a body part of a user around the wearable electronic device, and
        determine a control command corresponding to a combination of the at least one first touch input, the at least one second touch input, and the hovering input.

8. The wearable electronic device of claim 7, further comprising at least one of a sensor, a camera, and a touch panel located on one side of the wearable electronic device,
    wherein the processor is further configured to:
        receive the hovering input via at least one of the sensor, the camera, and the touch panel located on the one side of the wearable electronic device.

9. The wearable electronic device of claim 7, wherein the at least one touch input via the front portion of the touch panel and the hovering input are generated from different regions provided in and around the wearable electronic device.

10. The wearable electronic device of claim 7, wherein the processor is further configured to receive a hovering input of a consecutive gesture type.

11. The wearable electronic device of claim 10, wherein the processor is further configured to determine a control command corresponding to a gesture of the hovering input.

12. The wearable electronic device of claim 7, wherein the processor is further configured to:
    determine a first control command corresponding to the at least one first touch input and the at least one second touch input, and
    change the first control command to a second control command in response to the hovering input.

13. A non-transitory computer-readable recording medium having recorded thereon a computer program, which, when executed by a computer, performs the method of claim 1.

* * * * *